United States Patent [19]

Ghest et al.

[11] 4,238,833
[45] Dec. 9, 1980

[54] HIGH-SPEED DIGITAL BUS-ORGANIZED MULTIPLIER/DIVIDER SYSTEM

[75] Inventors: Robert C. Ghest, Saratoga; John M. Birkner; Shlomo Waser, both of Sunnyvale; Hua T. Chua, Cupertino, all of Calif.

[73] Assignee: Monolithic Memories, Inc., Sunnyvale, Calif.

[21] Appl. No.: 24,540

[22] Filed: Mar. 28, 1979

[51] Int. Cl.$^3$ .................................................. G06F 7/52
[52] U.S. Cl. ..................................... 364/760; 364/766
[58] Field of Search ................................. 364/760, 766

[56] References Cited

U.S. PATENT DOCUMENTS

| | | | |
|---|---|---|---|
| 3,730,425 | 5/1973 | Kindell et al. | 364/760 |
| 4,065,666 | 12/1977 | Wu | 364/766 X |
| 4,122,527 | 10/1978 | Swiatowiec | 364/760 X |
| 4,153,938 | 5/1979 | Ghest et al. | 364/760 |
| 4,168,530 | 9/1979 | Gajski et al. | 364/760 |

*Primary Examiner*—David H. Malzahn
*Attorney, Agent, or Firm*—Harry M. Weiss

[57] ABSTRACT

A bus organized 16×16 (or 8×8) high-speed digital bus-organized multiplier/divider for high-speed, low-power operation is implemented on a single semiconductor chip. Four working registers each of 16 (or 8) bits are used in the system. These registers are a multiplier register, a multiplicand and divisor register, a first accumulator register for storing the least significant half of a double length product after a multiplication of the remainder after a division operation, and a second accumulator register which stores the most significant half of the product after a multiplication or the quotient after a division operation. A decoder is connected to the multiplicand and multiplier registers to implement the Modified Booth Algorithm and to encode the 16 (or 8) multiplier digits. The system operates to shift the multiplier number through the multiplier register to a position where the Modified Booth Algorithm encoding takes place. The Modified Booth encoder then controls the operation of multiplexer circuits to which the outputs of the multiplicand register are applied to produce successive partial products. A carry/save arithmetic logic unit operates in conjunction with the registers to cause accumulation and storage of multiplication products and division quotient/remainders in the double length accumulator registers which provide a 32 bit output number.

26 Claims, 21 Drawing Figures

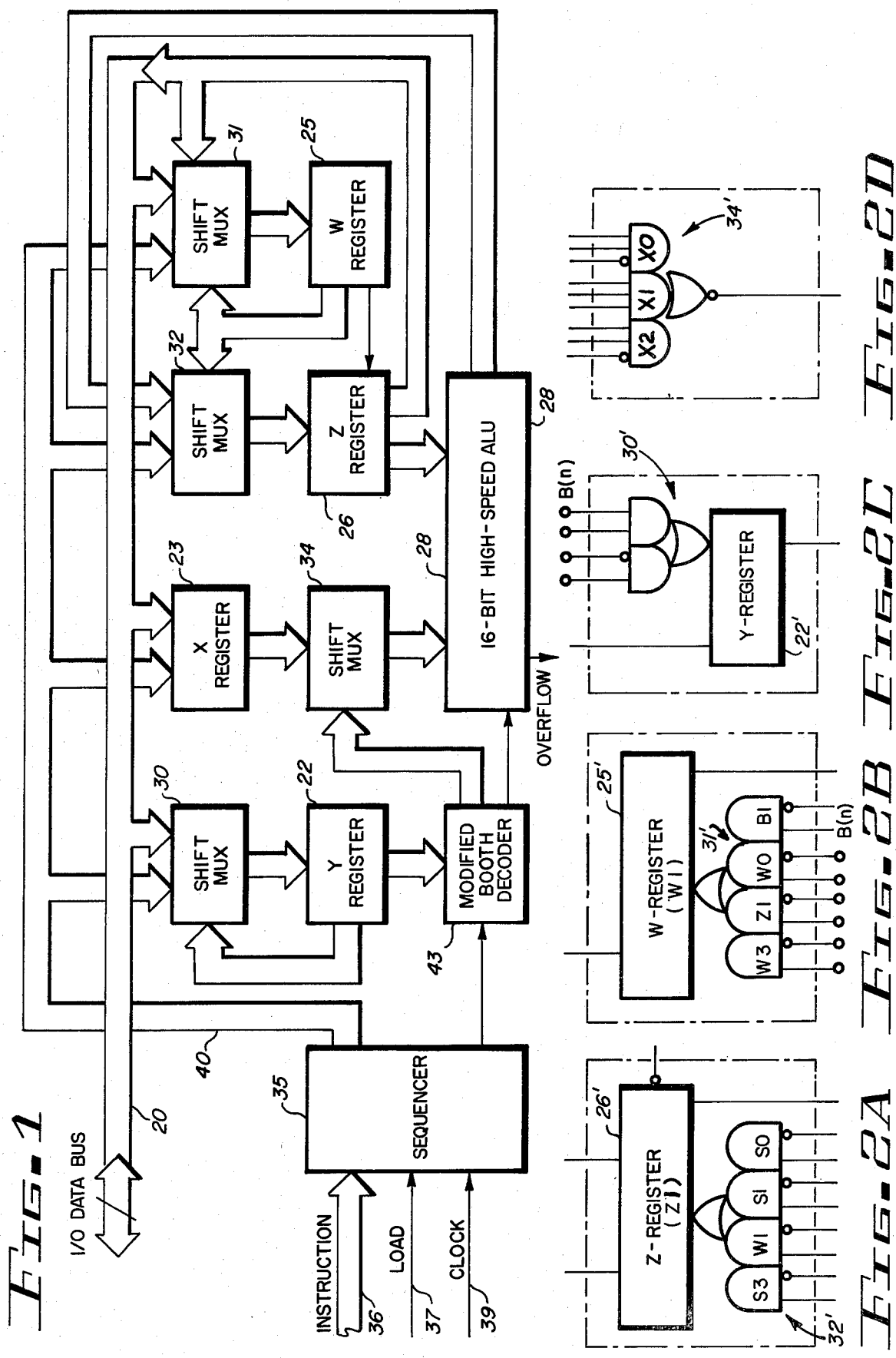

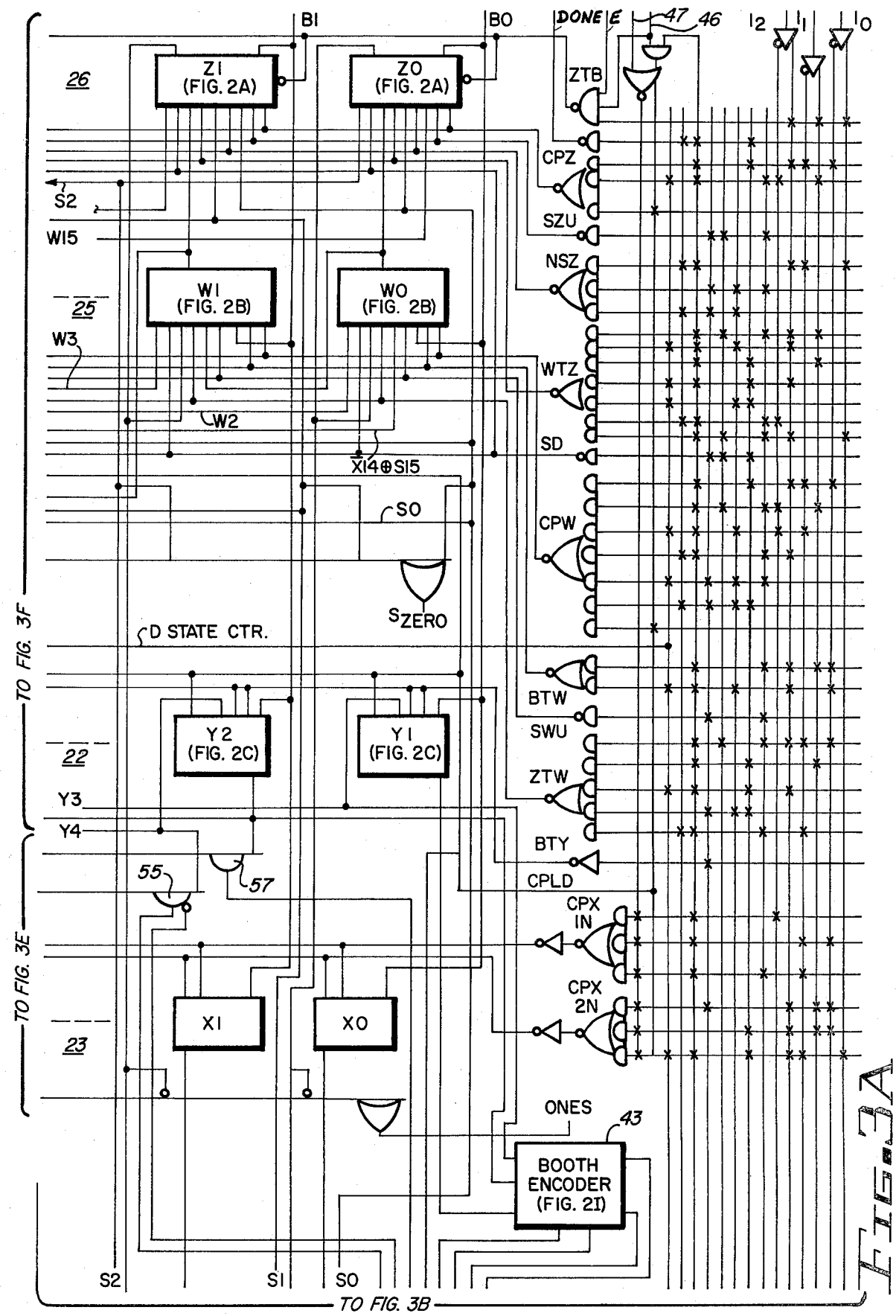

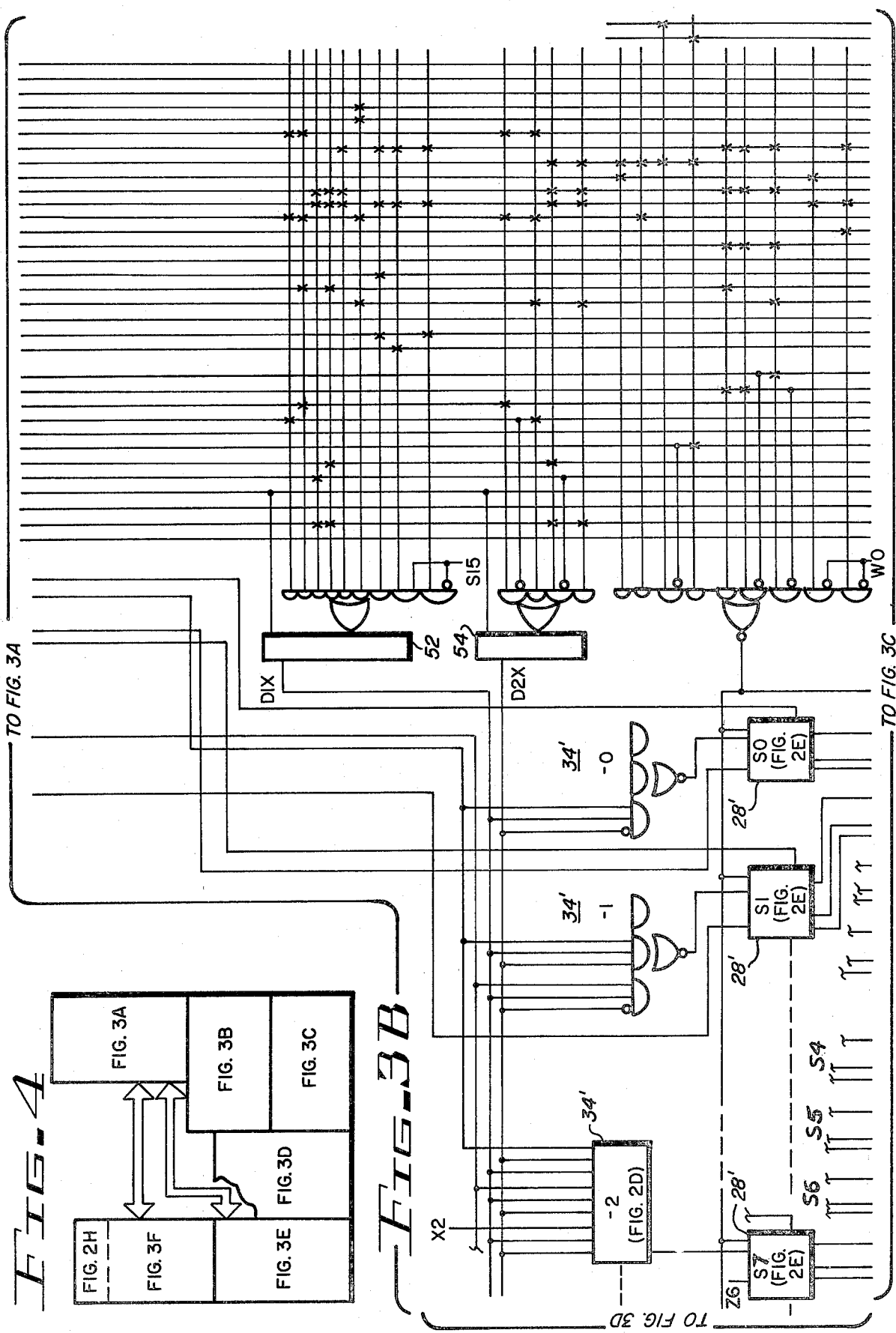

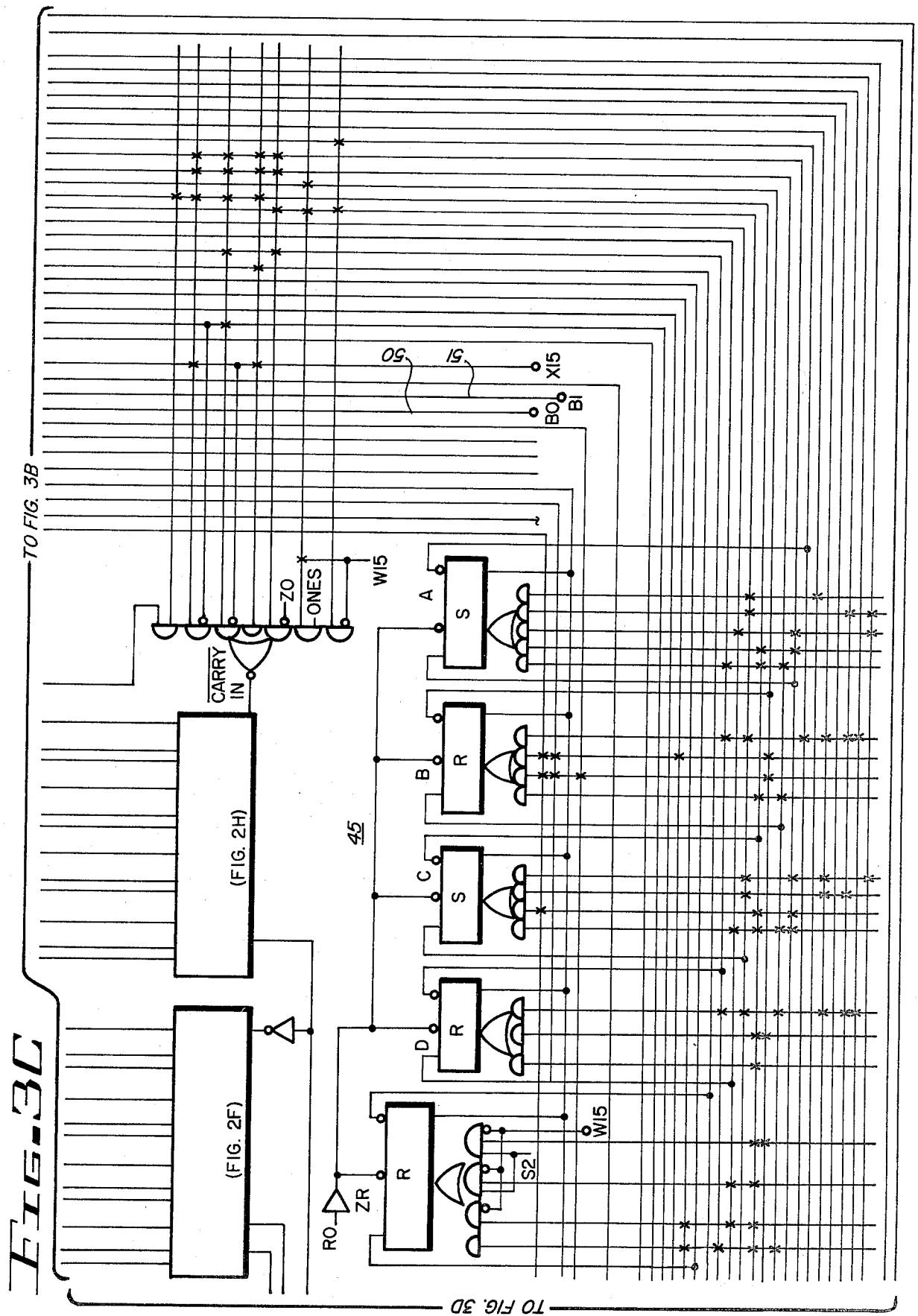

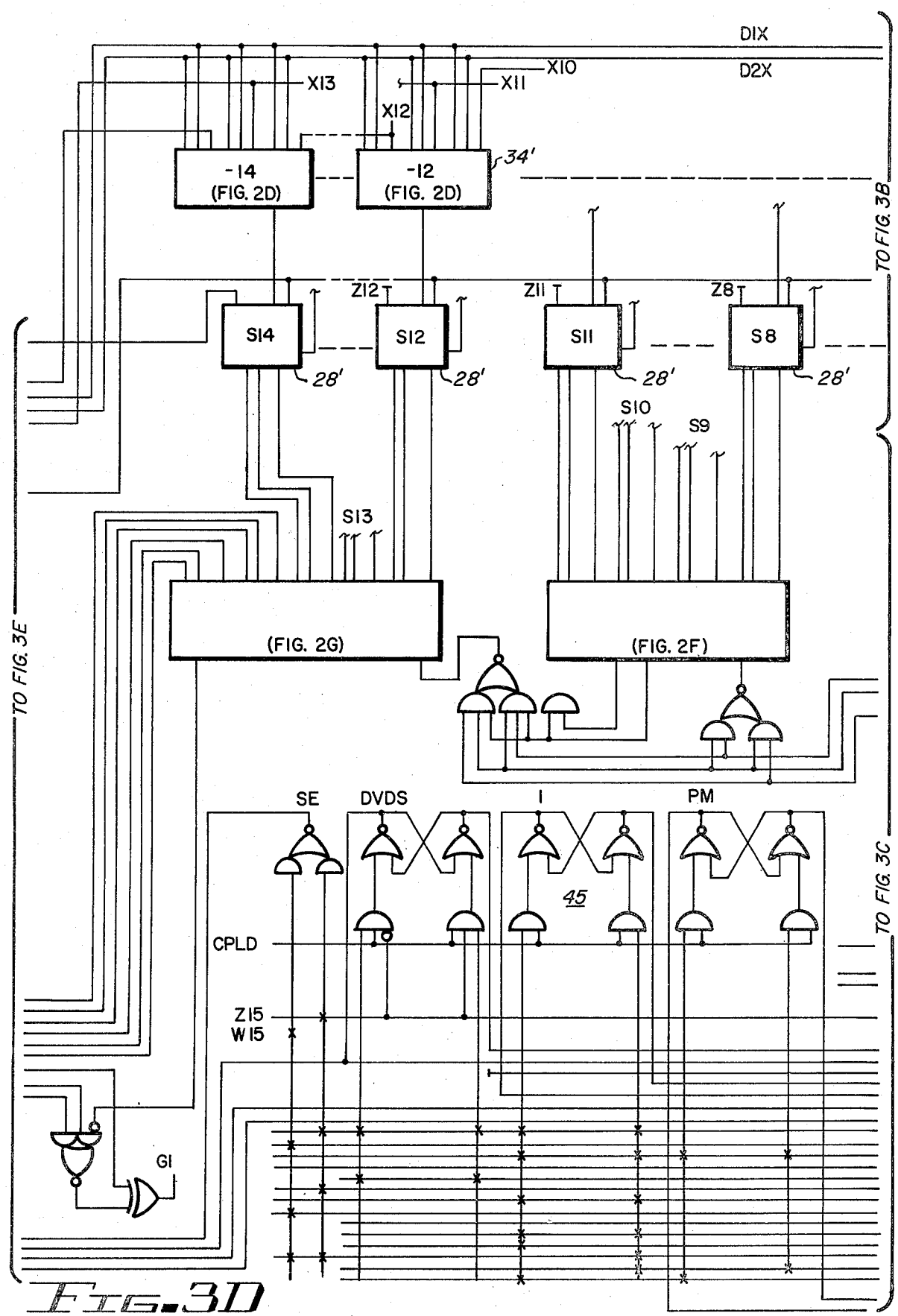

| | | TIME SLOT | | | | | | | | | | | | | |
|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 |
| X'Y | INST. CODE | 0 | | | | | | | | | | | | | |
| | BUS | Y | MULTIPLY NEW Y BY CONST. (POS.) | | | | | | | | | | | | |
| −X'Y | INST. CODE | 1 | | | | | | | | | | | | | |
| | BUS | Y | MULTIPLY NEW Y BY CONST. (NEG) | | | | | | | | | | | | |
| X'Y+KZ,KW | INST. CODE | 2 | MULTIPLY NEW Y BY CONST. (POS.) | | | | | | | | | | | | |
| | BUS | Y | & ACCUMULATE (DOUBLE LENGTH) | | | | | | | | | | | | |
| −X'Y+ KZ,KW | INST. CODE | 3 | MULTIPLY NEW Y BY CONST. (NEG.) | | | | | | | | | | | | |
| | BUS | Y | & ACCUMULATE (DOUBLE LENGTH) | | | | | | | | | | | | |
| XY | INST. CODE | 5/6 | 0 | | | | | | | | | | | | |
| | BUS | X | Y | NEW X TIMES NEW Y (POS.) | | | | | | | | | | | |
| −XY | INST. CODE | 5/6 | 1 | | | | | | | | | | | | |
| | BUS | X | Y | NEW X TIMES NEW Y (NEG.) | | | | | | | | | | | |
| XY+KZ,KW | INST. CODE | 5/6 | 2 | NEW X TIMES NEW Y (POS.) | | | | | | | | | | | |
| | BUS | X | Y | & ACCUMULATE (DOUBLE LENGTH) | | | | | | | | | | | |
| −XY+ KZ,KW | INST. CODE | 5/6 | 3 | NEW X TIMES NEW Y (NEG.) | | | | | | | | | | | |
| | BUS | X | Y | & ACCUMULATE (DOUBLE LENGTH) | | | | | | | | | | | |
| XY+Z | INST. CODE | 5/6 | 6 | 0 | | | | | | | | | | | |
| | BUS | X | Z | Y | NEW X·Y (POS.), ADD TO Z | | | | | | | | | | |
| −XY+Z | INST. CODE | 5/6 | 6 | 1 | | | | | | | | | | | |
| | BUS | X | Z | Y | NEW X·Y (NEG.), ADD TO Z | | | | | | | | | | |
| XY+KZ | INST. CODE | 5/6 | 6 | 2 | NEW X·Y (POS.), ADD TO SINGLE | | | | | | | | | | |
| | BUS | X | − | Y | LENGTH SIGNED # | | | | | | | | | | |
| −XY+KZ | INST. CODE | 5/6 | 6 | 3 | NEW X·Y (NEG.), ADD TO SINGLE | | | | | | | | | | |
| | BUS | X | − | Y | LENGTH SIGNED # | | | | | | | | | | |
| XY+Z,W | INST. CODE | 5/6 | 6 | 6 | 0 | NEW X·Y (POS.) − DOUBLE LENGTH | | | | | | | | | |
| | BUS | X | Z | W | Y | ADDITION | | | | | | | | | |
| −XY+Z,W | INST. CODE | 5/6 | 6 | 6 | 1 | NEW X·Y (NEG.) − DOUBLE LENGTH | | | | | | | | | |
| | BUS | X | Z | W | Y | ADDITION | | | | | | | | | |
| XY+Wsign | INST. CODE | 5/6 | 6 | 6 | 2 | NEW X·Y (POS.), ADD SINGLE LENGTH | | | | | | | | | |
| | BUS | X | − | W | Y | SIGNED # | | | | | | | | | |
| −XY+Wsign | INST. CODE | 5/6 | 6 | 6 | 3 | NEW X·Y (NEG.), ADD SINGLE LENGTH | | | | | | | | | |
| | BUS | X | − | W | Y | SIGNED # | | | | | | | | | |

FIG. 5

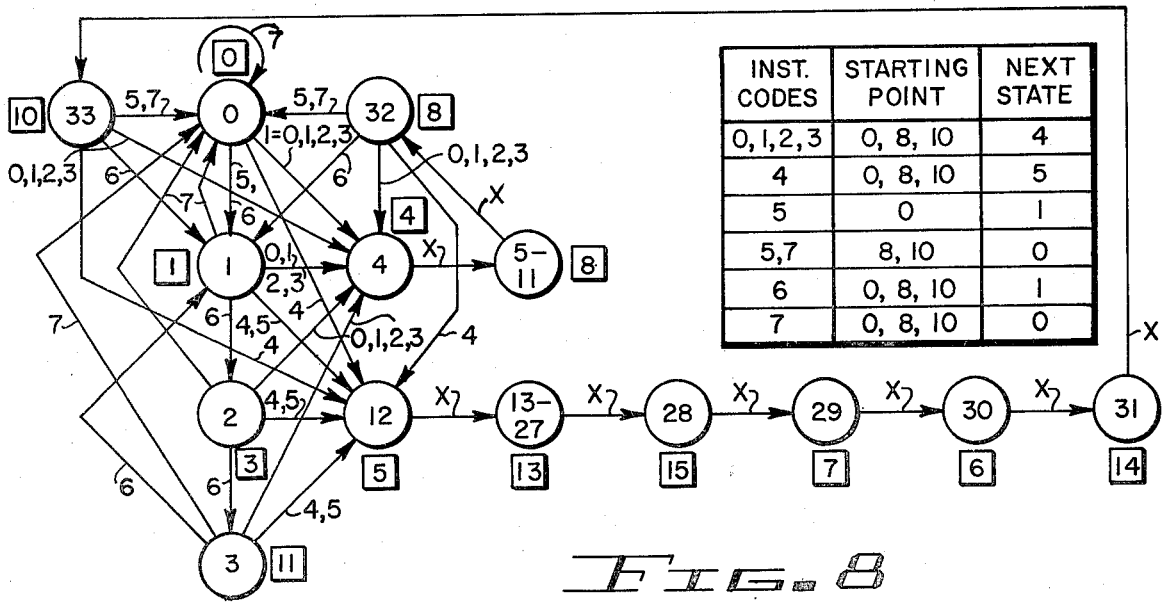

| OPERATION | | TIME SLOT | | | | | | | | | | | | | | | | | | | | | | | |
|---|---|---|---|---|---|---|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
| KZ, KW/X' | INST. CODE | 4 | | | | | | | | | | | | | | | | | | | | | | | |
| | BUS | — | CONTINUAL DIVISION OF QUOTIENT AND REMAINDER BY CONSTANT (X1) | | | | | | | | | | | | | | | | | | | | | | |
| KW/X | INST. CODE | 5/6 | 4 | | | | | | | | | | | | | | | | | | | | | | |
| | BUS | X | — | DIVISION OF REMAINDER BY NEW DIVISOR | | | | | | | | | | | | | | | | | | | | | |
| KZ/X | INST. CODE | 5/6 | 4 | | | | | | | | | | | | | | | | | | | | | | |
| | BUS | X | — | DIVISION OF QUOTIENT BY NEW DIVISOR | | | | | | | | | | | | | | | | | | | | | |
| Z, W/X | INST. CODE | 5/6 | 6 | 4 | | | | | | | | | | | | | | | | | | | | | |
| | BUS | X | Z | W | DOUBLE LENGTH DIVISION | | | | | | | | | | | | | | | | | | | | |
| Z/X | INST. CODE | 5/6 | 6 | 5 | | | | | | | | | | | | | | | | | | | | | |
| | BUS | X | Z | — | SINGLE LENGTH DIVISION | | | | | | | | | | | | | | | | | | | | |
| W/X | INST. CODE | 5/6 | 6 | 4 | | | | | | | | | | | | | | | | | | 1 | | | |
| | BUS | X | — | W | SINGLE LENGTH UNSIGNED DIVISION | | | | | | | | | | | | | | | | | 1 | 1 | | |
| Ws/X | INST. CODE | 5/6 | 6 | 5 | | | | | | | | | | | | | | | | | | | | 1 | |
| | BUS | X | O | W | SINGLE LENGTH SIGNED DIVISION | | | | | | | | | | | | | | | | | | | 1 | 1 |

FIG. 6 (lower table)

| INST. CODE 12 11 10 | 0 | 1 | 2 | 3 |
|---|---|---|---|---|
| 000 LOAD MULT CLR POS | X'Y SM | XY SM | XY+Z SM | XY+Z,W SM |
| 001 LOAD MULT CLR NEG | -X'Y SM | -XY SM | -XY+Z SM | -XY+Z,W SM |
| 010 LOAD MULT POS | X,Y+KZ,KW SM | XY+KZ SM | XY+KZ2-15 SM | XY+Wsig SM |
| 011 LOAD MULT NEG | -X,Y+KZ,KW SM | -XY+KZ SM | -XY+KZ2-15 SM | -XY+Wsig SM |
| 100 LOAD DIVIDE | $\frac{KZ,KW}{X'}$ SD | $\frac{KW}{X}$ SD | $\frac{Z,W}{X}$ SD | $\frac{Wuns}{X}$ SD |
| 101 LOAD FR & DIVIDE & RND | LOAD FR SI | $\frac{KZ}{X}$ SD | $\frac{Z}{X}$ SD | $\frac{Wsig}{X}$ SD |
| 110 LOAD INT | LOAD INT SI | LOAD S1 | LOAD S2 | LOAD S3 |
| 111 READ | READ SO | | | |

FIG. 7

| | MULTIPLY/DIVIDE | END MULTIPLY | END DIVIDE |
|---|---|---|---|
| | → | X'Y SM | X'Y SM |
| | | -X'Y SM | -X'Y SM |
| | | X'Y+KZ,KW SM | X'Y+KZ,KW SM |
| | | -X'Y+KZ,KW SM | -X'Y+KZ,KW SM |
| | | $\frac{KZ,KW}{X'}$ SD | $\frac{KZ,KW}{X'}$ SD |
| | | ROUND MULTIPLY SO | ROUND DIVIDE SO |
| | | LOAD SI | LOAD SI |
| | | READ SO | READ SO |

HIGH-SPEED DIGITAL BUS-ORGANIZED MULTIPLIER/DIVIDER SYSTEM

BACKGROUND OF THE INVENTION

High speed digital multipliers and digital dividers have a wide number of applications in digital signal processing. Multiplication or division of binary numbers can be performed in a relatively simply manner. For multiplication, a classic approach is to provide an accumulate register which has twice the length n of the operands, because the product can approach twice the size of the operands. The multiplier is conveniently stored in the less significant half of the accumulator register. The most significant half and the contents of a multiplicand register are applied to an adder. The output of the adder is effectively the sum of the accumulated partial products and the potential partial product consisting of one times the multiplicand. A series of n cycles is set up. For each cycle, the least significant bit of the accumulator is examined; and the output of the adder is stored in the more significant half of the accumulator or not, in accordance with that bit being a binary "1" or a "0", respectively. The accumulator then is shifted to the right one bit, and the cycle is repeated until the entire multiplier has been examined. As a consequence, the multiplicand has been multiplied by $2^n$, for every "1" bit in the multiplier; and these partial products have been accumulated with the proper alignment due to the cyclic shifts which divide the result by 2 in each cycle. Various techniques exist in the art for handling different sign combinations of the operands, for the different types of number representations, that is, sign and magnitude, 1's complement and 2's complement.

A problem which exists with a digital multiplier of the type just described is that for 16 bit operands, the process calls for 16 cycles to obtain each of the 16 different partial products. These partial products then are added together in an additional 16 adder circuits to obtain the final resultant product, and all of the gates and other circuitry results in dissipation of a substantial amount of power. In addition, as the size of the multiplier increases (for example from an $8 \times 8$ to a $16 \times 16$ or a $32 \times 32$ multiplier), the length of time for accomplishing the multiplication increases in direct proportion.

Because of the large number of circuit components which are necessary with such a prior art approach, implementation of large multipliers on a single LSI chip has not proved practical. As a result such circuitry is usually implemented in several chips which must be interconnected together externally to form the complete circuit.

Another disadvantage with the standard prior art approaches is the dissipation of relatively large amounts of power, so that it is necessary to employ forced air cooling or other types of cooling during the operation of the system. The resultant machine is correspondingly increased in complexity and cost as a result of the relatively high power dissipation.

A solution to some of the problems inherent in the prior art is disclosed in U.S. Pat. No. 4,153,938 issued May 8, 1979 filed on Aug. 18, 1977 and assigned to the same assignee as the present application. In this copending application, a high speed $8 \times 8$ digital multiplier is implemented in a single LSI chip using circuitry for implementing a Modified Booth Algorithm to examine the binary multiplier 3 bits at a time and shifted 2 bits at a time in sequence for performing the multiplication function. In the copending application, this examination is effected through the use of several Modified Booth encoder gating circuits, each responsive to a different group of 3 bits of the multiplier input register, for controlling the shifting of the outputs of the multiplicand register applied to the input of an array of carry/save adder circuits to effect the desired multiplication. The result is a reduction in the number of cycles required to complete the multiplication operation and a reduction in the circuitry necessary to carry it out, along with reduced power dissipation.

It is desirable to implement a $16 \times 16$ multiplier on a single integrated circuit chip and further to implement a $16 \times 16$ multiplier/divider system on a single IC chip for high speed operation with minimal power consumption. Other features which are desirable in such multiplier/divider circuits, and which are particularly desirable in circuits implemented in a single integrated circuit chip, are the ability to multiply and accumulate in a single cycle of operation, to perform the entry of new data from the input busses simultaneously with the processing of previous entries, and the multiplication or division of new entries or accumulated entries by a constant.

SUMMARY OF THE INVENTION

It is an object of this invention to provide an improved high-speed digital multiplier.

It is another object of this invention to provide an improved high-speed digital multiplier/divider.

It is an additional object of this invention to provide a high-speed digital multiplier of at least 16 bits by 16 bits on a single semiconductor chip.

It is still another object of the invention to provide a high-speed digital multiplier/divider on a single semiconductor chip having reduced power dissipation.

It is still a further object of this invention to provide a bus organized multiplier/divider having a variety of different multiply and divide options controlled by external instruction signals.

Yet another object of this invention is to implement a high-speed, low-power dissipation digital multiplier/divider system utilizing circuitry which generates a reduced number of partial products.

In accordance with the preferred embodiment of this invention, a digital multiplier circuit includes registers for receiving the multiplier inputs and the multiplicand inputs. A partial product generator coupled to the registers includes an encoder which encodes the multiplier inputs according to the Modified Booth Algorithm to produce control signals which are applied to a plurality of multiplexer circuits interconnecting the multiplicand register with the partial product generating circuitry to produce the resultant number. The information in the multiplier register is shifted on a step-by-step basis through the register to present the contents of the register to the encoder circuitry; so that only a single Modified Booth Algorithm encoder circuit is required, irrespective of the length of the multiplier in the multiplier register.

In more specific embodiments of the invention, accumulator registers are provided and the system includes operating mode control circuitry for permitting operation of the system either as a multiplier or as a divider. In addition, a state counter is used in conjunction with external mode control signals applied to the circuit to permit a variety of multiplication and accumulation functions as well as a variety of divider functions to be accomplished by the system. These functions include positive and negative multiplication, positive and negative accumulation, multiplication by a constant, and both single and double length addition in conjunction with mmultiplication, along with divide options including single or double length division, division of a previous generated number, division by a constant, and continual division of a remainder or quotient.

BRIEF DESCRIPTION OF THE DRAWINGS

FIG. 1 is a block diagram of a digital/divider according to a preferred embodiment of the invention;

FIGS. 2A through 2I are details of subcircuits of the system;

FIGS. 3A through 3F constitute a complete logic diagram implementing the preferred embodiment of the digital multiplier/divider of FIG. 1;

FIG. 4 shows the manner in which the sheets of FIGS. 3A to 3F fit together;

FIG. 5 is a table showing sixteen different multiplication options;

FIG. 6 is a table showing seven different division options;

FIG. 7 is a table which correlates sequence numbers with instruction codes; and

FIG. 8 is a state diagram.

DETAILED DESCRIPTION

Figure 2E:
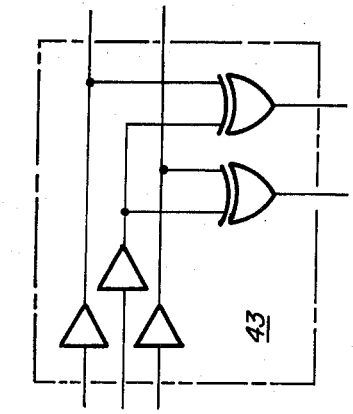

Reference now should be made to the drawings in which the same reference numbers generally are used throughout the several Figures to designate the same or similar components. Before entering into a discussion of the detailed circuitry of the digital multiplier/divider shown in FIGS. 3A through 3F, reference should be made to FIG. 1 which shows the digital multiplier/divider circuit in block diagram form. The multiplier/divider circuit in FIG. 1 is a high-speed $16 \times 16$ bit (or $8 \times 8$ bit) multiplier/divider circuit which has the capability of multiplying two 16 bit signed (2's complement) numbers or of diviing two such numbers. The entire circuit illustrated in FIG. 1 and shown in FIGS. 3A through 3F in detail, is implemented on a single semiconductor chip. The system uses standard low-power Schottky technology operating from a single +5 volt supply and is a TTL compatible device.

The multiplier, multiplicand, dividend and divisor input numbers are supplied to the system on an input-/output data bus 20, which also is supplied with the output information read from the system upon completion of the various multiplication and division operations which may be performed by the system.

The system includes four working registers each of 16 (or alternatively 8) bits capacity. These registers include a Y register 22 which is the multiplier register, an X register 23 which is the multiplicand and divisor register, a W register 25 and a Z register 26 which comprise accumulator registers and into which the dividend is stored for a division operation. The Z register 26 is used to store the most significant half of a product after a multiplication or the quotient after a division operation. The W register 25 stores the least significant half of a product after a multiplication or the remainder after a division operation. In addition to the registers 22, 23, 25 and 26, there is a 16 bit (or 8 bit) high-speed arithmetic logic unit 28 which performs addition, subtraction and shifting operations in order to generate the required arithmetic function for the particular operations which are being performed by the system.

Control of the information supplied into the registers 22, 25 and 26 is effected through shift multiplex logic units 30, 31 and 32, respectively. A similar shift multiplex logic unit 34 is connected between the outputs of the X register 23 and the 16 inputs of the arithmetic logic unit 28.

The loading of operands into the working registers and control of the system operation for the various multiplication and division modes of operation is controlled by means of a sequencer circuit 35. The particular mode of operation is selected by instruction signals which are supplied to the sequencer 35 on parallel instruction leads 36, a load signal applied over a lead 37 and clock signals applied over a lead 39 to the sequencer 35. A load signal must be low in order for the clock pulses on the lead 39 to activate the loading process and permit the system to continue on to the next step in the loading operation. The loading of the operands into the particular registers in the order required for the function which is to be performed by the system is controlled by outputs from the sequencer on multiple output control leads 40 which control the operations of the shift multiplexers 30, 31 and 32 and which control the application of data on the data busses to the X register 23.

After all of the operands are loaded, the system steps to the multiply or to the divide routine which is specified by the codes on the instruction leads 36 and performs the required operation under control of the sequencer 35. After n/2 clock periods for a multiplication operation (or n+4 clock periods for a division operation), the system is ready to place the result on the data busses 20 in proper time sequence.

When the system is operated in one of its multiplication modes, the multiplication operation is controlled by a Modified Booth decoder circuit 43 in time sequence with the operation of the sequencer circuit 35 to control the application of the outputs of the X register (storing the multiplicand), as the multiplier is shifted through the Y register 22, to the arithmetic logic unit 28 through the shift multiplex circuit 34. By using multiplication implementing the Modified Booth Algorithm substantial savings in logic and in the time required to perform the multiplication operation is effected. The data in the Y register is shifted through the register to present successive groups of three sequential data bits of the multiplier to the Modified Booth decoder. Each of these groups overlaps one of the three bits of each of the next preceding and next succeeding groups. By shifting the data through the Y register, only a single Modified Booth decoder circuit 43 is necessary for the entire system.

Before entering into a detailed discussion of the detailed operation of the system which is shown in FIGS. 2A through 2I and 3A through 3F, an explanation of conventional digital multiplication and the technique by which it is effected is considered in order. Conventional binary digital multiplication is illustrated in the following table:

TABLE 1

| X — | $X_7$ $X_6$ $X_5$ $X_4$ $X_3$ $X_2$ $X_1$ $X_0$ |
|---|---|
| Y — | $Y_7$ $Y_6$ $Y_5$ $Y_4$ $Y_3$ $Y_2$ $Y_1$ $Y_0$ |
| A — | $A_7$ $A_6$ $A_5$ $A_4$ $A_3$ $A_2$ $A_1$ $A_0$ |

TABLE 1-continued

|   |   |   |   |   |   |   |   |   |   | $B_7$ | $B_6$ | $B_5$ | $B_4$ | $B_3$ | $B_2$ | $B_1$ | $B_0$ |   |
|---|---|---|---|---|---|---|---|---|---|---|---|---|---|---|---|---|---|---|
|   |   |   |   | C | — |   |   |   | $C_7$ | $C_6$ | $C_5$ | $C_4$ | $C_3$ | $C_2$ | $C_1$ | $C_0$ |   |   |
|   |   |   | D | — |   |   |   | $D_7$ | $D_6$ | $D_5$ | $D_4$ | $D_3$ | $D_2$ | $D_1$ | $D_0$ |   |   |   |
|   |   | E | — |   |   |   | $E_7$ | $E_6$ | $E_5$ | $E_4$ | $E_3$ | $E_2$ | $E_1$ | $E_0$ |   |   |   |   |
|   | F | — |   |   |   | $F_7$ | $F_6$ | $F_5$ | $F_4$ | $F_3$ | $F_2$ | $F_1$ | $F_0$ |   |   |   |   |   |
| G | — |   |   |   | $G_7$ | $G_6$ | $G_5$ | $G_4$ | $G_3$ | $G_2$ | $G_1$ | $G_0$ |   |   |   |   |   |   |
| H | — |   |   | $H_7$ | $H_6$ | $H_5$ | $H_4$ | $H_3$ | $H_2$ | $H_1$ | $H_0$ |   |   |   |   |   |   |   |
| S | — | $S_{15}$ | $S_{14}$ | $S_{13}$ | $S_{12}$ | $S_{11}$ | $S_{10}$ | $S_9$ | $S_8$ | $S_7$ | $S_6$ | $S_5$ | $S_4$ | $S_3$ | $S_2$ | $S_1$ | $S_0$ |   |

In table 1, an 8 bit multiplicand X is multiplied by an 8 bit multiplier Y. The multiplication technique which is illustrated by the pattern shown in table 1, also may be expanded to multiplication of 16 bit numbers, 24 bit numbers or the like. It is considered sufficient for the purposes of illustration here to illustrate the technique using multiplication of two 8 bit numbers. The multiplication takes place in a well known fashion of multiplying each bit of X by Y to obtain a first partial product A. This partial product is given the same weight as the weight of $Y_0$. Then each bit of multiplicand X is multiplied by $Y_1$ to obtain a partial product B, which is shifted to the left 1 bit in order to give it the same weight as is given to $Y_1$.

Similarly the other bits of multiplicand X are multiplied by each bit of multiplier Y to provide partial products C, D, E, F, G and H, all of which are given the appropriate weight by shifting each one, respectively, to the left by 1 bit with respect to the preceding partial product. Thus eight partial products are obtained according to this method in order to multiply two 8 bit binary numbers. If two 16 bit binary numbers are multiplied, sixteen different partial products must be obtained to effect the complete multiplication.

When all of the partial products, properly shifted and aligned, are added together, a 16 bit product "S" is obtained for the multiplication of the two 8 bit numbers. Similarly, a 32 bit product "S" is obtained from the multiplication of two 16 bit binary numbers. This is indicated in the table 1 by the total, showing the bits for the multiplication of the two 8 bit numbers in the product as $S_1$ to $S_{15}$.

For binary arithmetic, each multiplication by the bits $Y_0$, $Y_1$, etc. is easily accomplished by gating each bit of X with appropriate ones of the bits $Y_0$, $Y_1$, etc., depending on which of the different multiplications is occurring. Shifting also is easily accomplished in binary arithmetic by merely wiring the appropriate output of a gate to the appropriate input of an adjacent bit of the subsequent gating stage. Assuming that shifting is done by hard-wired alignment (rather than by a shift register), it is readily seen that it takes 64 gates to obtain the partial products, A, B, C, D, E, F, G and H, plus an additional 16 adder circuits to obtain the final product $S_0$ to $S_{15}$. Each of these different circuit elements dissipates a substantial amount of power. Because of the power dissipated and the real estate which is occupied by the circuitry to effect these different circuit elements, it has been necessary in the past to implement 8 bit and 16 bit multiplications by the use of several integrated circuit chips.

In the above identified copending application, a technique permitting the integration of an 8 bit binary multiplier on a single integrated circuit chip by effecting the multiplication using a "Modified Booth Algorithm" has been disclosed. The number of partial products required to implement the digital multiplication in that application has been significantly reduced because of implementation of the Modified Booth Algorithm. In the system shown in FIG. 1 and in greater detail in FIGS. 3A through 3F, multiplication also is effected by an even more efficient implementation of the Modified Booth Algorithm which produces a different set of partial products from the set shown in table 1 above.

In the following table, identified as table 2, there is an illustration of the set of partial products produced within a digital multiplier employing a Modified Booth Algorithm in place of the conventional digital multiplication technique illustrated in table 1. As with table 1, table 2 is illustrated in conjunction with an 8 bit binary number; but expansion of the table to handle the multiplication of two 16 bit binary numbers is readily apparent from an examination of the pattern established in table 2. For an 8 bit binary number, 4 partial products are essential to implement the Modified Booth Algorithm. A fifth partial product is included in order to accomodate multiplication in either signed or unsigned binary numbers. For multiplication of 16 bit binary numbers, 8 partial products are necessary; and a ninth partial product is included to accomodate multiplication in either signed or unsigned binary numbers.

With reference to table 2, if the multiplier Y indicates a signed representation, the fifth partial product (E) is not needed and it is made equal to zero. On the other hand, if the multiplier Y indicates unsigned representation, as established by appropriate instruction codes, then the Modified Booth Algorithm requires a correction, which is implemented by adding the fifth partial product (E). This partial product is made equal to 256 times the multiplicand. In order to understand the justification for this conclusion, three cases need to be considered. Case number one is $Y_7$ equals "0" in either the signed or unsigned representation. Case number two is $Y_7$ equals "1" for the signed representation. This has a weight of $-128$. Case number three is $Y_7$ equals "1" for the unsigned representation. This has a weight of $+128$. The Booth Algorithm has to be corrected for case number three by adding $+256$ to $-128$ to get $+128$, which is the correct interpretation for the unsigned representation.

TABLE 2

|   |   |   |   |   |   |   | $X_7$ | $X_6$ | $X_5$ | $X_4$ | $X_3$ | $X_2$ | $X_1$ | $X_0$ |
|---|---|---|---|---|---|---|---|---|---|---|---|---|---|---|
|   |   |   |   |   |   |   | $Y_7$ | $Y_6$ | $Y_5$ | $Y_4$ | $Y_3$ | $Y_2$ | $Y_1$ | $Y_0$ |
| A |   |   |   |   |   | $a_9$ | $a_8$ | $a_7$ | $a_6$ | $a_5$ | $a_4$ | $a_3$ | $a_2$ | $a_1$ | $a_0$ |
| B |   |   |   | $b_9$ | $b_8$ | $b_7$ | $b_6$ | $b_5$ | $b_4$ | $b_3$ | $b_2$ | $b_1$ | $b_0$ |   |   |
| C |   | $c_9$ | $c_8$ | $c_7$ | $c_6$ | $c_5$ | $c_4$ | $c_3$ | $c_2$ | $c_1$ | $c_0$ |   |   |   |   |
| D | $d_9$ | $d_8$ | $d_7$ | $d_6$ | $d_5$ | $d_4$ | $d_3$ | $d_2$ | $d_1$ | $d_0$ |   |   |   |   |   |

TABLE 2-continued

| E | $e_7$ | $e_6$ | $e_5$ | $e_4$ | $e_3$ | $e_2$ | $e_1$ | $e_0$ | | | | | | | | |
|---|---|---|---|---|---|---|---|---|---|---|---|---|---|---|---|---|
| | $S_{15}$ | $S_{14}$ | $S_{13}$ | $S_{12}$ | $S_{11}$ | $S_{10}$ | $S_9$ | $S_8$ | $S_7$ | $S_6$ | $S_5$ | $S_4$ | $S_3$ | $S_2$ | $S_1$ | $S_0$ |

The technique employed in the Modified Booth Algorithm for effecting multiplication is to "look at" combinations of sequential identical bits of the multiplier Y in groups in order to obtain a particular partial product. According to the original Booth Algorithm, the encoding circuitry for effecting this "skips over contiguous logical zeros" in the multiplier. If there is a group of contiguous logical "ones", according to the Booth Algorithm, the numerical value of a binary number consisting of a group of contiguous "ones" can be determined by subtracting the weight of the least significant bit of the string of contiguous "ones" from the "weight" of the next higher significant bit than the most significant bit of the string of contiguous zeros. This is best understood by reference to a specific example. Consider, for the purposes of illustrating the Booth Algorithm, the application of this technique to the following binary number:

TABLE 3

| Position Weight | 13 | 12 | 11 | 10 | 9 | 8 | 7 | 6 | 5 | 4 | 3 | 2 | 1 | 0 | |
|---|---|---|---|---|---|---|---|---|---|---|---|---|---|---|---|
| Absolute Weight | 8192 | 4096 | 2048 | 1024 | 512 | 256 | 128 | 64 | 32 | 16 | 8 | 4 | 2 | 1 | |
| Bit Position | 14 | 13 | 12 | 11 | 10 | 9 | 8 | 7 | 6 | 5 | 4 | 3 | 2 | 1 | |
| | 1 | 1 | 0 | 0 | 1 | 1 | 1 | 0 | 1 | 1 | 1 | 1 | 0 | 0 | = 13244 |

In applying the Booth Algorithm to the above number, the value of each of the groups of contiguous logical "ones" then is determined in accordance with the expression $2^M - 2^{N-1}$, where M is the bit position of the most significant bit of the string (which is the same as the positional weight of the next higher significant bit than the most significant bit of the string of contiguous "ones") and where N is the bit position of the least significant bit of the string. Thus, for the specific binary number under consideration, the decimal value, using the Booth Algorithm formula for each of the different groups of the contiguous "ones", may be expressed as follows:

TABLE 4

| Decimal Value | $= (2^6 - 2^2) + (2^{10} - 2^7) + (2^{14} - 2^{12})$ |
|---|---|
| | $= (64 - 4) + (1024 - 128) + (16384 - 4096)$ |
| | $= 60 + 896 + 12288$ |
| | $= 13244$ |

This formula also may be expressed in another way where the value equals $2^{W_a+1} - 2^{W_b}$, where W is equal to the positional weight of the bits, and Wa is the positional weight of the most significant binary "one" ("1") in a contiguous string of binary "ones" and Wb is the positional weight of the least significant binary "one" in a contiguous string of binary "ones."

It is apparent, from an examination of the foregoing, that different binary numbers having different numbers of groups of contiguous identical bits (ones or zeros) would require different amounts of time to complete a multiplication. To eliminate this variation, an algorithm known as a Modified Booth Algorithm is utilized where the system examines or "looks at" three bits of the multiplier Y at a time, and then shifts two bits at a time to look at the next groups of three bits. One bit of each such three bit group is common to the end bit of one string and the beginning of another string. This has been illustrated in the above identified related application. The following truth table discloses the Modified Booth Algorithm which is used in the operation in the circuit shown in FIGS. 1 and 3A through 3F:

TABLE 5

| | Absolute Weight | 2 | 1 | ½ | |
|---|---|---|---|---|---|
| | W = Positional Weight | 1 | 0 | .−1 | Multiplier |
| No String | | 0 | 0 | 0 | 0 |
| Beginning of String | | 0 | 0 | 1̄ | $2^{-1+1} = 1$ |
| String | | 0 | 1̄ | 0 | $2^{0+1} - 2^0 = 1$ |
| Beginning of String | | 0 | 1̄ | 1̄ | $2^{0+1} = 2$ |
| End of String | | 1̄ | 0 | 0 | $-2^1 = -2$ |
| Beginning & End of String | | 1̄ | 0 | 1̄ | $2^{-1+1} - 2^1 = -1$ |
| End of String | | 1̄ | 1̄ | 0 | $-2^0 = -1$ |
| Middle of String | | 1 | 1 | 1 | 0 |

In the above Modified Booth Algorithm truth table, the absolute weight and the positional weight, W, of the multiplier Y for the various combinations of binary "ones" and "zeros" which can occur for each 3 bit group being examined is shown. The right hand column of the table shows the multiplying factor which results from each of these different groups of three bits. The value of the multiplying factor is determined by the formula used above in explaining the Booth Algorithm. The "Modified Booth Algorithm" is described and explained in detail in the article, "A Proof of the Modified Booth Algorithm for Multiplication", by Louis B. Rubinfield on page 1014 of the 1975 "IEEE Transactions on Computers", October 1975.

In order to implement the Modified Booth Algorithm, it is necessary that the multiplier word have an additional "dummy" bit which is always assumed to be a binary "zero." In the above identified related application, the multiplication through the use of the Modified Booth Algorithm is effected by supplying each of the different ones of the overlapping 3 bit groups of the multiplier to different Booth encoder circuits. Each encoder circuit examines a different 3 bit group to form the partial products in the proper alignment as shown in Table 2. These partial products then are added by an adder array to obtain the desired 16 bit product, S0 - S15, for the multiplication of two 8 bit numbers, or to obtain the desired 32 bit product, S0 - S32, for the multiplication of two 16 bit binary numbers.

According to the Modified Booth truth table shown in table 5, each of the different 3 bit binary groups is compared in a suitable gating array to the appropriate columns of the Modified Booth truth table to determine which of the different possibilities indicated in the right hand column (the multiplier column) is indicated. That is, is the multiplier to be multiplied once times the multiplicand (X), twice the multiplicand (2X), minus twice the multiplicand (−2X), minus the multiplicand (−X), or should all zeros be gated to the outputs of the multiplexer to produce the desired subject partial product.

The above identified copending application accomplishes the desired economies over conventional multipliers by using the Modified Booth Algorithm. Because of the large number of encoders required however, along with the associated circuitry, it has not been possible to implement the multiplier technique of such application in a single integrated circuit chip for a 16×16 bit multiplier. According to the present invention however, the implementation of a 16 by 16 bit multiplier circuit, which also is capable of a variety of multiplication functions as well as a variety of division functions is effected on a single integrated circuit chip.

Figure 2I:
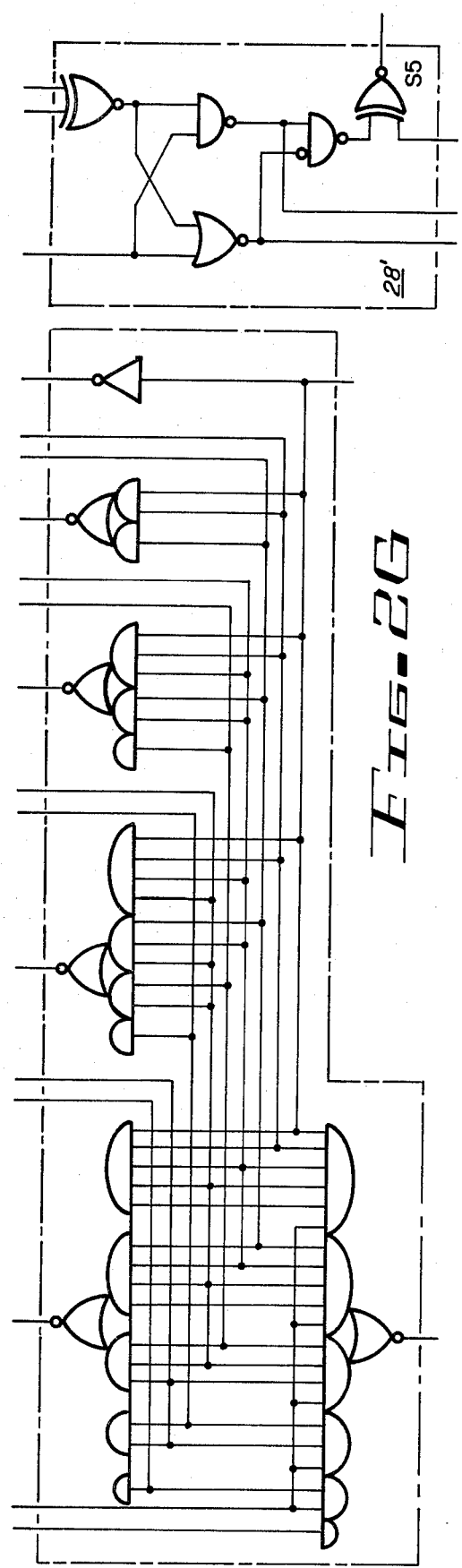
Figure 2G:
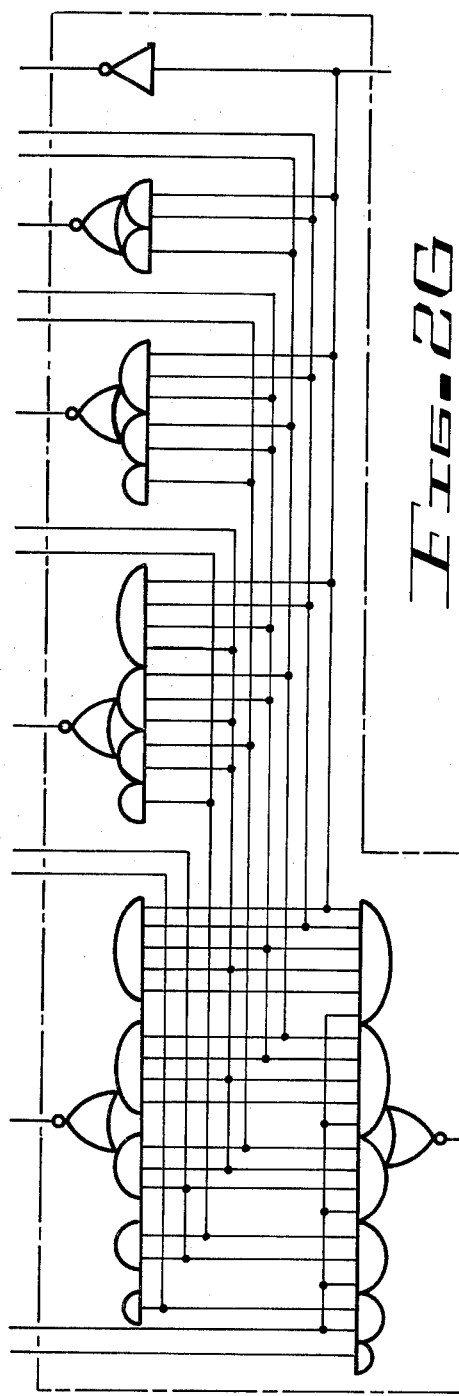
Figure 2F:
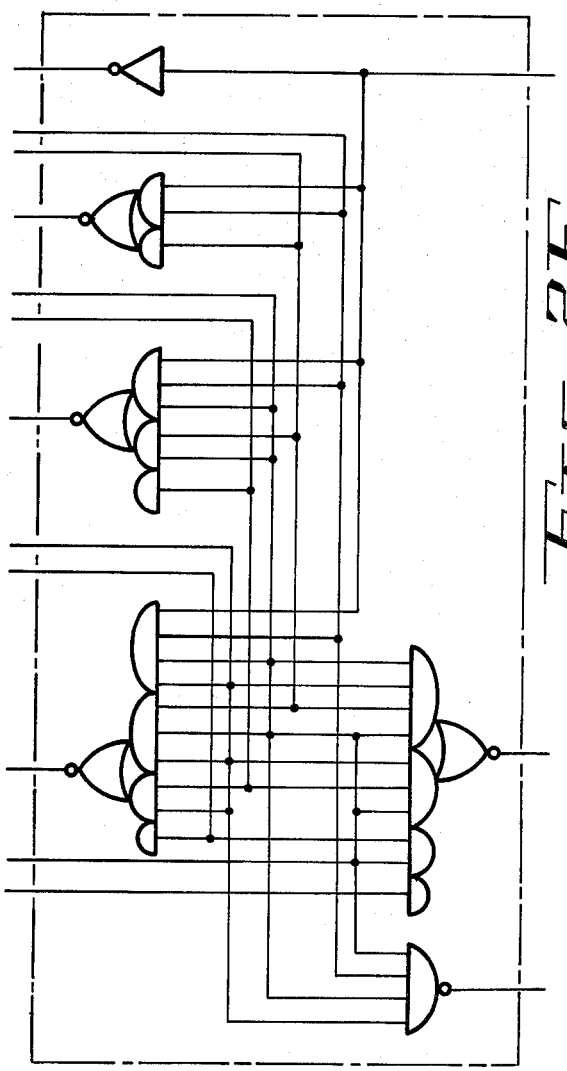
Figure 2H:
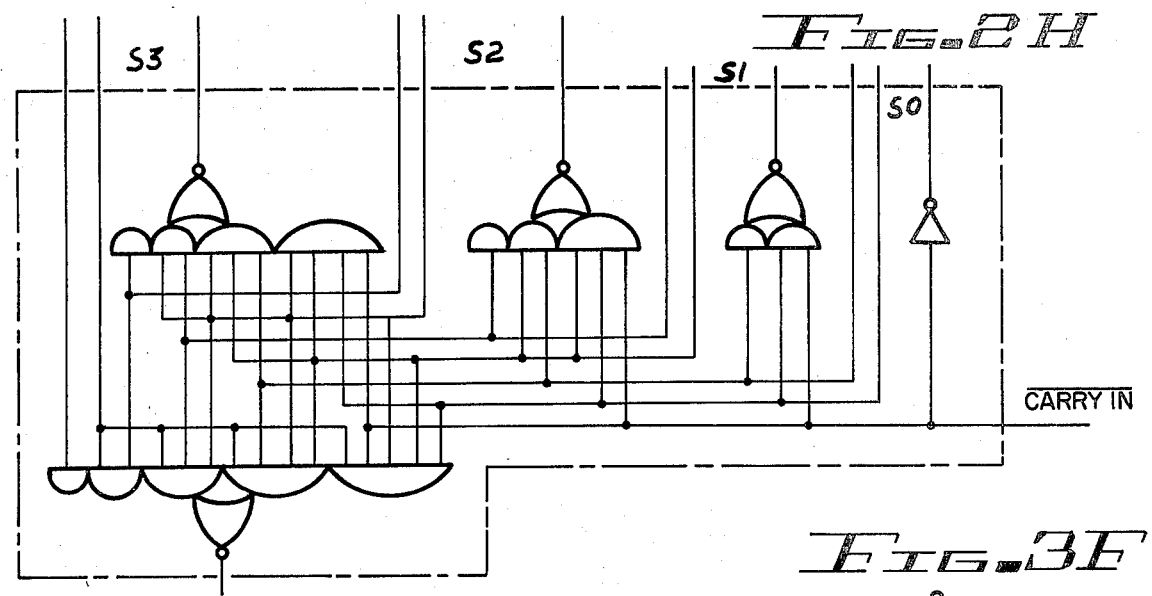
Figure 3F:
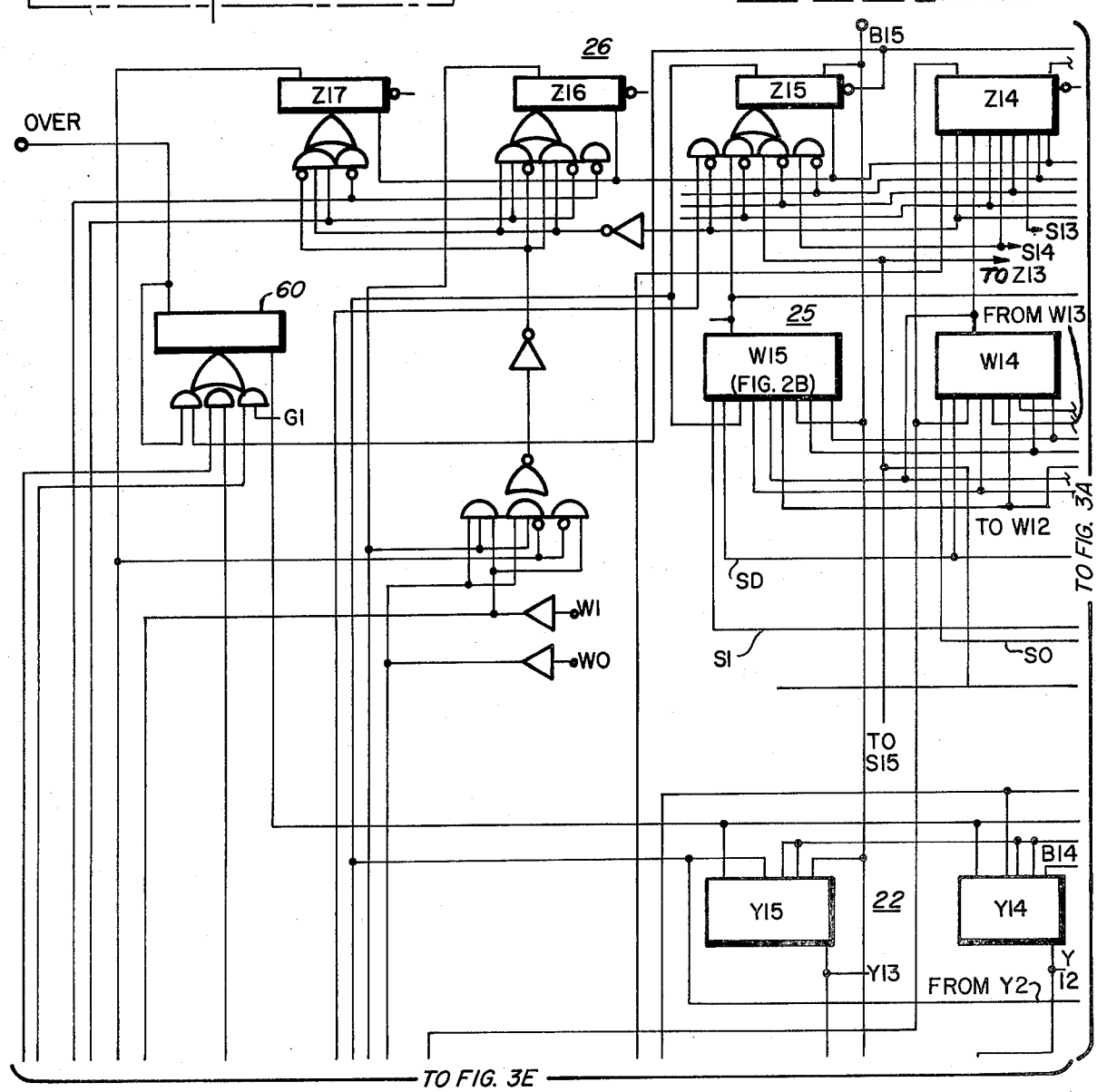

A modification of the technique using a Modified Booth Algorithm for the multiplication is effected in the circuit shown in detail in FIGS. 3A through 3F, and reference now should be made to that circuit. The complete logic diagram of this system is shown in the six sheets of FIGS. 3A through 3F which are assembled together to form a composite circuit diagram as indicated in FIG. 4. A large portion of this system, as it is actually implemented on an integrated circuit chip, is reducdant or repetitive and the logic diagram has been reduced in size from the actual chip layout to eliminate this redundancy. Primarily the redundancies of this system occur in the gap shown in FIG. 4 between FIGS. 3A and 3F but the interconnections and interrelationships between the portions of the system shown on each of these two figures and a similar interconnection between the upper portion of FIG. 3E and the lower portion of FIG. 3A are indicated in FIG. 4 by the double-ended interconnecting arrows. To further reduce the complexity of the circuit diagram of FIGS. 3A through 3F, specific logic subcircuit elements which are used repetitively in the system, are shown in detail in FIGS. 2A through 2I. The description of the schematic circuit diagram of FIGS. 3A through 3F will be made in conjunction with the detailed subcircuit logic diagrams of FIGS. 2A through 2I in the description of the system which follows.

As mentioned above in conjunction with the block diagram of FIG. 1, the multiplier/divider system contains four working registers, the Y register 22, the X register 23, the W register 25 and the Z register 26 (FIG. 1). The X and W registers each include 16 bistable binary storage elements, the Y register includes 15 bistable binary storage elemtnts and the Z register includes 18 such storage elements. These storage elements are shown for the beginning and the ends of these registers in FIGS. 3A, 3E and 3F. Because of the substantial circuit redundancy which exists for the remainder of the storage elements in each of these registers extending between the ones which are shown in these figures, the remaining storage elements of the registers have not been shown; but they interconnect in the same manner as the elements shown, to the wiring indicated as extending between FIG. 3A and FIGS. 3E and 3F, as illustrated.

There are 16 parallel busses, B0–B15, in the data bus 20 which serve as specific input/output data busses for the 16 parallel bits of information supplied to and obtained from the 16×16 multiplier/divider circuit shown in FIG. 3. Only the B0, B1 and B15 busses have been specifically shown, but these are typical of all of the busses. The bus interconnections for busses B2 through B14 to the remainder of the circuit are similar to the connections shown for these three busses.

To further reduce the complexity of the logic diagram of FIGS. 3A through 3F, portions of the logic circuits which are repetitively used are shown in detail in FIGS. 2A through 2H and the location of these circuit portions is indicated by reference to the different sections on the corresponding portions of the block diagram of the logic circuit of FIGS. 3A through 3F. For example, the representation of each of the Y, W and Z registers in FIG. 3A shows blocks for each of the register sections with references being made for the sections of the Z register to FIG. 2A, for the sections of the Z register to FIG. 2A, for the sections of the W register to FIG. 2B and for the sections of the Y register to FIG. 2C. These three FIGS., 2A, 2B and 2C show the details of the shift multiplex circuits which are connected to the signal inputs of each of the three registers; and the inputs to these shift multiplex circuits are in the same orientation as the input leads to the blocks for these registers as shown in FIGS. 3A and 3F.

The designations within the gates and storage elements shown in FIGS. 2A, 2B and 2C are for a typical register section as identified. Comparable connections for all of the other register sections are made in accordance with the same patterns represented by the designations shown. Exceptions which occur at the beginning and end of the registers are marked in FIGS. 3A and 3F. Thus, for an understanding of the enabling of the various input gates to the register under consideration, reference can be made to the appropriate one of the FIGS. 2A through 2C to determine at any given time which of the various inputs to those registers are enabled at the time a clock pulse is applied to the register to control the entry and storage of binary data in the register. The registers themselves comprise conventional bistable storage registers of the type commonly used in a large number of electronic systems applications. The gating circuit logic designations which are used in FIGS. 2 and 3 are conventional gating representations well known in the art and are of the same type disclosed in the above-identified copending application.

For the purpose of eliminating the showing of unnecessary wiring and for simplifying the logic diagrams, where a number of logic gates (AND gates, INHIBIT gates, NOR gates, etc.) supply outputs in common to multiple inputs of an OR gate or a NOR gate, the gates are merely shown as clustered together touching one another and touching the input side of the OR gate or the NOR gate to which they supply signals. In the operation of such circuits for example, the circuit shown in FIG. 2A, an output from any one of the four input gates shown in that circuit for the multiplexer section 32′ is passed through the OR gate to the input of the Z register section 26′ in accordance with standard circuit operation. These various gates and their interconnections are readily implemented by those skilled in the art.

In FIGS. 2A through 2D, primed referenced numbers are used to designate individual sections of the same registers and shift multiplex circuits which are designated by the unprimed number in the system block diagram of FIG. 1. Each of FIGS. 2A through 2D represents a single section of the corresponding multiplexers and registers which are utilized in the system; and these sections are repeated to the extent designated by the weighting designations shown in FIGS. 3A and 3F to result in the different totals of sections in the various registers, as indicated most clearly in FIG. 3F, and as mentioned above.

Control of the operation of the system and establishment of its internal operating sequence is effected by both external control and internal state counter. The external control is applied over three control or address inputs I0, I1, I2, respectively, shown in the upper right hand corner of FIG. 3A. These inputs and their complements provide the system inputs in the form of instruction codes applied over the six vertical leads along the right hand edge of FIG. 3A and extending downwardly along the right hand edges of FIGS. 3B and 3C and along the bottom of FIG. 3C. At the lower left hand portion of FIG. 3C, and the lower right hand portion of FIG. 3D, is an internal state counter 45. This counter 45 operates in conjunction with the instruction codes applied over the leads I0, I1 and I2 to select the required function for the system and to drive the sequencer from state to state in order to effect the desired operation utilizing the registers and the high speed logic unit 28 along with the various shift multiplex circuits.

Two other important control inputs are supplied from external sources. These comprise a load signal input on a load input control lead 46 and a series of externally generated clock pulses on a clock pulse input 47.

The outputs of the various stages of the state counter 45 and the various externally supplied input signals shown applied to the circuit in the upper right hand corner of FIG. 3A all are interconnected with the internal circuit logic through AND gates. These AND gates are designated on the horizontal input leads for various control gates by the "X" cross connections between these leads and the external input leads and the output leads from the state counter 45. These designations have been made in FIG. 3 in place of showing more conventional AND gate logic for the purpose of simplifying the drawing and to more readily show the specific combinations of various signals which are necessary to produce an input to the corresponding control gates (primarily shown in FIG. 3A). By way of example, the lowermost input to the uppermost logic control gate shown in the vertical string of gates just to the left of all of the vertical control leads has a signal applied to it only when all three of the normal (non-inverted) signals on the instruction codelines I0, I1 and I2 are binary "1" (111). This is represented by the three "X's" connecting these lines with the horizontal input lead for this gate. This is the condition for causing the system to read out data onto the busses B0 to B15; and the output of this gate is labeled ZTB which is an acronym for "Z OUT TO BUS". This means that when a signal is obtained from this gate, the information stored in the Z register 26 in stages Z0 through Z15 is read out in parallel on the busses B0 through B15.

Comparable acronyms are provided at the outputs of the other control gates in this vertical string in FIG. 3A which produce the control signals or gating signals to the various shift multiplexers connected to the inputs of the Y, W and Z registers. These various acronyms, which are shown in the drawing adjacent the outputs of the gates with which they are associated, and their meanings are given below:

| CPZ | Clockpulse for Z register. |
| --- | --- |
| SZU | Sum from the arithmetic logic unit (times 2) to Z register. |
| NSZ | Sum from the arithmetic logic unit (times 1) to Z register. |
| WTZ | W to Z swap (shift information from W register to Z register). |
| SD | Sum from the arithmetic logic unit divided by 4) to W and Z registers. |
| CPW | Clockpulse W register. |
| D | Output from D stage of stage counter 45. |
| BTW | Bus to W (store data on busses in W register. |
| SWU | Shift information in W register left 1 position. |
| ZTW | Z to W swap (transfer data in Z register to W register). |
| BTY | Bus to Y (store data on busses in Y register). |
| CPLD | Clockpulse load. |
| CPX1N | Clock slave section of X register. |
| CPX2N | Clock master section of X register. |

The above list specifies the function of the control signals which are obtained from the outputs of the correspondingly labeled gates whenever coincidence of the various signals on the instruction code lines I0, I1, I2, the load input 46, the clockpulse input 47, and the various combinations of outputs from the state counter 45 coincide to produce the designated output. (This coincidence is shown by the crosspoint "X's"). The sequence at which all of this takes place in accordance with the various operations which can be effected by the system is graphically illustrated in FIGS. 5, 6, 7 and 8.

The specific manner in which various system operations take place on a clockpulse-by-clockpulse basis for each of the different combinations of multiplication and division functions which can be performed by the system will not be described in detail. Instead, a general description of the system operation specifically referring to particular portions of the system logic diagram which are shown in FIG. 3, supplemented by the subcircuits of FIG. 2, will enable those skilled in the art to understand the functional operation of the system, the details of which are shown in the various figures of the drawing.

A general description is considered in order first. The operands are first loaded into the various working registers in time sequence at each clock period of the clockpulses applied to the lead 47 under control of the sequencer circuits, consisting of the gates described in the above chart along with the outputs of the state counter 45 and the instruction code inputs I0, I1 and I2. To permit the loading of data appearing on the busses B0 through B15 as an operand into any of the registers, a load signal must be low in order for the clockpulse to activate the loading process and continue on to the next step in the loading operation. After all of the operands are loaded, the system jumps to the multiply or to the divide routine (as established by the inputs on the instruction code leads I0, I1 and I2) and performs the required operation. After n/2 clock periods for a multiplication (or n+4 clock periods for a division), the system is ready to place the result as a parallel output signal on the busses B0 through B15 in time sequence.

The three control inputs I0, I1 and I2 select the required function and drive the sequencer (by way of the state counter 45) from state to state. As a consequence, the action of the multiplier/divider system shown in FIG. 3 (supplemented by the subcircuits of FIGS. 2A through 2I) at any particular clock period is a function of the internal machine state and the state of the external control inputs. FIG. 7 shows the multiply/divide state table and all of its possible operations for both multiplication and division functions. After a readout or rounding operation has taken place, the machine is driven back to its state 0; and a new sequence of arithmetic operations may be commenced.

If chain operations are being performed, such as accumulate products, then state 0 is bypassed; and loading of an operand or jumping to the arithmetic operation occurs at the end of the previous arithmetic operation. For a multiplication operation this occurs at state 32 and for a division operation this occurs at state 33. This is explained subsequently in greater detail.

The X register 23 is a dual rank (master/slave) register which allows the loading of an operand X during the multiplication or division process. That is, a new operand for the next multiplication or division operation can be added while the previous operand is being utilized in a currently run multiplication or division operation.

If the machine enters its loading sequence and a new X operand has not been loaded into the X register 23, the machine proceeds with the previously loaded X operand. This permits multiplication by a constant or division by a constant (the previously loaded X operand). To accomplish this, the X register 23 merely includes a cascaded master/slave set of bistage registers; and the busses B0 to B15 are connected respectively to the corresponding inputs to the master section of the X register elements X0 through X15. New data is entered into the master section in response to the application of a clock pulse from the clock master gate CPX2N. In the absence of such a pulse, the previously entered data remains in the master section irrespective of any changes which may occur on the busses B0 through B15. Transfer of the data from the master section to the salve section, from which multiplication and division operations using the X operands are effected, is accomplished under control of a clock pulse from the clock slave gate CPX1N. Examination of the inputs to both of these gates indicates the various combinations of instruction codes and outputs from the state counter 45 which produce these pulses in the proper time sequences for the various operations which take place in the system.

Continuing to refer to FIG. 3, (supplemented by the subcircuits of the various parts of FIG. 2) description of the operation of the system for its multiplication modes of operation is given. The system provides two's complement 16 bit multiplication with the circuit shown in FIG. 3. Because of its modular arrangement, an 8×8 multiplier/divider circuit or a larger multiplier/divider circuit can be implemented using the same techniques which are illustrated for the 16×16 multiplier/divider of FIG. 3.

By use of the two registers W and Z (25 and 26) double length products may be generated; and the system also can add into a product either a single length or a double length number. Again, because of the parallel arrangement between the registers and the arithmetic logic unit, no time penalty is incurred for accumulation since the machine accumulates while the multiplication operation is proceeding, that is both of these operations occur simultaneously. In addition, as stated previously, a previously loaded operand loaded into the X register can be used as a constant; so that constant multiplication is possible as well as constant multiplication and accumulation.

FIG. 5 shows the 16 different multiplication options which are possible with the machine. Before entering into a discussion of the operation of the circuit of FIG. 3 for the various multiplication options which are available, a brief description of FIG. 5 is considered to be in order. The left hand column of FIG. 5 symbolizes the various different multiplication operations and multiplication and accumulation operations which are possible. Immediately to the right of these designations is a column divided into two parts for each of the different operations. The upper part carries a designation "INST CODE" and the lower carries the designation "BUS". To the right of each of these designations for each of the different multiplication options there is, for the "INST code" designation, a decimal number 0 through 6. This designation is the decimal value of the binary encoded instruction code (INST code) for causing the system to enter into the various operational modes which are indicated in FIG. 5. This is the code applied on the leads I0, I1 and I2 of FIG. 3A.

The "BUS" designation identifies the particular register into which the bus data is entered as an operand in response to the instruction code in the time slot (produced by the clock pulses on the lead 47) following the start of the machine for the particular multiplication operation shown.

To the right of these designations are 8 "time slots" corresponding to the next 8 clock pulses. This is the time period during which the multiplication operation takes place. Irrespective of which of the different multiplication options are being utilized, the multiplication operation time is always the same length. It is apparent from an examination of FIG. 5, however, that for some of the more complex operations, additional clock periods are necessary for loading the additional operands. In the spaces representing the time during which the multiplication operation takes place, a legend is provided to indicate the particular multiplication operation which is being effected.

Summarizing FIG. 5, the upper four operations all are the various multiplication operation which take place with a previously loaded X operand (x'). These are for multiplication operations where multiplication by a constant (X') is being utilized. The next four operations (reading down from the top of FIG. 5) are for multiplication operations where new X and new Y operands both are entered into the system. The third group of four (still reading from the top) again are for multiplication operations where new X operands are used and are added to the accumulator (note that KZ is a single length signed number, the most significant half of the previous product added in at the least significant end). Finally, the lowermost group of four multiplication options is the multiplication of new X and Y operands, with the product added to double length numbers, or added to a single length signed number as indicated.

Fractional or integer operation is possible both for multiplication and division, and is controlled by the code entered on the instruction code lines during time slot "1" of the multiplication operations for all multiplication operations except those using a previously stored X operand (X') for multiplication by a constant. If the binary encoding of the instruction code leads is equivalent to a decimal 6, integer multiplication is specified. If fractional working is desired, code 5 is placed on the instruction leads. This is the reason the alternative designation 5/6 is shown for this time slot in the lower 12 multiplication operations illustrated in FIG. 5. When integer multiplication (or division) is specified, all numbers are scaled from the least significant end of the registers, and the least significant bit is assumed to have a weight of $2^0$. For integer multiplication, accumulation, and division, all numbers are scaled from this least significant weight; and results are correct if interpreted in this manner. The double length registers Z and W 26 and 25, can therefore hold numbers in the range $-2^{31}$ to $+2^{31}-1$; and the operands X and Y and single length results are in the range $-2^{15}$ to $+2^{15}-1$ for the 16×16 chip which is illustrated in FIG. 3.

When the machine is working with fractions (designated by encoding on the instruction code lines I0, I1 and I2 corresponding to decimal 5), the machine automatically performs scaling; so that input operands and results have a consistant format. All numbers in the fractional representation are scaled from the most significant end which has a weight of $2^0$ and is negative. The binary point is one place to the right of this most significant bit; so that the next bit has a weight of $2^{-1}$. The double length registers Z, W therefore hold numbers in the range $-1$ to $1-2^{-31}$, and the operands X and Y and single length results are in the range of $-1$ to $+1-2^{15}$. Since automatic scaling occurs, the product of two numbers always has the least significant bit as a 0, unless an accumulation is performed with the least significant bit as a 1.

It should be noted that during a chain operation with a partial result not being read out onto the busses B0 through B15, the machine will stay in either the fractional or integer mode initially established by the instruction codes. At the start of the sequence of operation, this integer or fractional operation is designated by loading the operands with a code 6 or a code 5 on the instruction code lines, respectively. It is possible to operate the machine with mixed fractions and integers by redefining the weight of the least or most significant bit. Care must be taken, however, due to the automatic scaling feature when fractional arithmetic is programmed.

Reference now should be made to FIG. 3 (supplemented by FIG. 2) in conjunction with FIG. 5, for the operation of the system for a typical multiplication operation. For the purposes of this illustration, assume that a basic multiplication of two new numbers (X, Y) is desired. Further assume that the product of these numbers then is to be transferred to the busses B0 to B15 at the completion of the multiplication. Again, for the purposes of this illustration, assume that multiplication of integers rather than fractions is desired.

To initiate the operation, with the machine in its zero or starting state, the instruction codes I0, I1 and I2 are encoded with the binary representation of the decimal number 6 to indicate that an integer is to be loaded into the X (multiplicand) register 23. At this point, the system does not distinguish between whether a division or a multiplication operation is to take place, since this first entry is the same for both multiplication and division operations. The X register 23 also is used to store the divisor in the first step of a division operation. As indicated in the corresponding XY multiplication section of FIG. 5, the entry of this instruction code, with the machine in its starting state, results in the transfer of the number appearing on the busses B0 to B15 to the master section of the X register 23.

New information then is presented on the busses B0 to B15 in the next time slot ("2"); and the instruction lines I0 to I2 are encoded with the binary representation (000) of the decimal number "0". At this second time slot, the number in the master section of the X register 23 is transferred to the slave section. Simultaneously, the information on busses B1 through B15 is stored in the corresponding sections Y1 through Y15 of the Y register. The data on the B0 bus is not stored in any section of the Y register since, when a Modified Booth Algorithm is utilized in effecting the multiplication function, this information is only a part of the first group of three bits and does not overlap any other group. The B0 bus input is presented to the system on a control lead 50 (the input to which is located in the lower right hand corner of FIG. 3C). Similarly, for effecting the Modified Booth Algorithm encoding of the first group of bits, the data present on the B1 bus is applied over a control lead 51 (also shown in FIG. 3C). A dummy bit (always binary "0") to the right of the B0 (Y0) bit is simulated in the gate encoding for the first partial multiplication effected by the system.

At this point, the system is ready to commence the multiplication operation. This is effected by sequentially presenting the data in the Y register in groups of three bits to the Modified Booth encoder 43 (the details of which are shown in FIG. 2I) to produce control outputs which are applied to a pair of 2's complement control registers 52 and 54 respectively. Other inputs are supplied to these registers from the instruction code leads and the state counter 45, as is apparent from an examination of FIG. 3B. The outputs of these registers are applied to correponding inputs of the shift multiplex circuit 34. The different individual sections 34' of this shift multiplex circuit are shown in FIG. 3B and in the detailed FIG. 2D. FIG. 2D illustrates the logic circuitry of all of the sections 34' of the shift multiplex circuit 34 used in conjunction with the X register, with the exception of the first two stages which are shown in detail in FIG. 3B.

The operation of the Booth Encoder circuit 43 to control the outputs of the registers 52 and 54 functions to form the partial products between the multiplicand in the X register 23 and the multiplier in the Y register 22 in accordance with the various combinations shown above in Table 5. The values of each of the 3 bit sequences applied to the input of the Booth encoder circuit 43 determine if the multiplicand is to be added to the partial product with a multiplying factor of 0, 1, $-1$, 2, or $-2$. The multiplicand is also multiplied (shifted) by the positional weight of the 3 bit group under evaluation by means of the shift multiplexer 34. This can be seen from an observation of the manner in which the outputs in each of the sections, X0 to X15, of the X register 23 are connected through the shift multiplexer 34 to any one of the inputs of three different sections of the arithmetic logic unit. For example, the X0 section of the X register 23 provides input signals to each of the S0, S1 and S2 stages of the arithmetic logic unit 28, and the particular one of these stages which receives these outputs at any given time is determined by the outputs of the registers 52 and 54. During the loading of the Y register 22 with a new operand, the B0 and B1 bus inputs appearing on the leads 50 and 51 control the registers 52 and 54 for the first partial multiplication operation. After this, control is effected by the outputs of the encoder 43.

During the multiplication operation, clock pulses are applied to each of the Y register elements 22' to cause the information stored in the Y register 22 to be shifted to the right two places in response to each clock pulse. An examination of the circuit interconnections between the Y register section 22' and the shift multiplexer stages 30' shows that the information stored in the Y register section Y3 is shifted into the Y1 register section, the information previously stored in section Y4 is shifted into section Y2 etc. By this operation, each clock pulse causes a new group of three bits to be presented to the inputs of the Booth encoder circuit 43 from the first three sections of the Y register 22 representative of the bits Y1, Y2 and Y3. The first bit of each group overlaps the last bit of the preceding group and the last bit of each group overlaps the first bit of the next succeeding group. Thus, the Modified Booth encoder 43 is presented with successive groups of three bits in accordance with the Modified Booth Algorithm to control the partial multiplications of the multiplicand in the X register by means of the operation on the shift multiplexer 34 in the manner described previously.

The output of the "D" stage of the state counter 45 is connected over the lead marked "D stage" near the center of FIG. 3A and is applied to the input of the Y register section 22' for bit Y14. The output of register Y2 is looped back to the input of the register Y15. The result is that a pair of gates 55 and 57 monitor the outputs of the different sections of the Y register 22 and sense when all of the information has been shifted through the Y register 22 for examination by the Booth encoder 43 and produce an "end multiply" signal for utilization by the system. The use of this output from the state counter 45 to the most significant end of the Y register 22 eliminates the need for a loop counter in the circuit and reduces the number of circuit elements which otherwise would be necessary to accomplish the same result.

Reference to FIG. 2 shows the details of the gating circuit interconnections for the W multiplexer sections 31' and the Z register multiplexer sections 32' which control the application of input signals to these registers for effecting the partial product multiplication and accumulation and for effecting the division operations of the system. In FIG. 2 the specific gate identifications for the W2 and Z2 sections of the W register 25 and the Z register 26 are identified. The pattern which is shown in the gates of the W multiplexer section 31' and the Z multiplexer section 32' in FIG. 2 is similar for the other sections associated with both of these registers. The specific representation shown in FIG. 2 is utilized for illustrative purposes. At any given time only one of the INHIBIT gates of each of these registers is enabled to pass the signal applied to its other input through it to the input of the corresponding multiplexer register section. The INHIBIT gate control in turn is effected by the outputs of the various control gates shown in FIG. 3A. The control gate outputs are determined by the circuit interconnections between the inputs of these gates and the outputs of the static counter 45 and the instruction lines I0, I1 and I2. As a result of the operation of the W multiplexer 31 and the Z multiplexer 32, the partial products of the multiplication of the operands in the X and Y registers are added to the previously accumulated information in the W register 25 and the Z register 26 to achieve the proper multiplication results.

Upon completion of the multiplication operation, a "read" code is applied to the instruction lines I0, I1 and I2. This code is a decimal 7 (binary 111) and results in the application of a readout pulse to the Z register 26. This causes the product stored in the Z register at the time of arrival of the readout pulse to be applied in parallel to the input output busses B0 through B15. This first readout of the Z register is only the most significant half of a product. Since the Z register 26 and the W register 25 comprise a double length accumulator, reading out of the complete product takes two time periods.

After a first readout pulse applied over the ZTB gate output to the Z register, if a code 7 (binary 111) still is present on the instruction lines at the time of the next clockpulse, the system operates to supply the least significant half of the product from the W register by transferring the data in the W register 25 to the Z register 26 from which it is supplied to the busses B0 to B15. To prevent the loss of any of this data, the contents of the Z register 26 are simultaneously supplied to the W register 25 or "swapped" with the contents of the W register. Continual "read" operations at the machine state 0 cause the contents of the Z and W registers to be swapped back and forth, resulting in a repetitive readout of the data in the double length accumulator supplied to the busses B0 to B15.

If the machine is requested to perform a "read" operation by the application of the "read" code 7 on the instruction lines during a loading sequence, the loading sequence is broken; and the machine is forced back to state "0", ready to start the sequence again. Initialization of the multiplier/divider system of FIG. 3 is easily performed by continually calling out code 7 on the instruction lines I0, I1 and I2, which, after a maximum of 21 clock periods, forces the machine back to state 0. It should be noted, from an examination from the system interconnections, that the "read" operation requires that the load signal is held low; so that the information is read out onto the bi-directional busses when the read code 7 is specified. The "load" signal acts as an enable pin in case several multipliers are tied to the same data bus.

The foregoing multiplication sequence is employed for the actual multiplication portion of all of the various different multiplication operations which can be accomplished by the system. The chart of FIG. 5 shows the different initializing instruction code sequences which are utilized to place the system in its different multiplication operational modes of operation. These different initializing code sequences result in the enabling of different ones of the control gates of FIG. 3A at various times. In addition, the initializing instruction code sequences also alter the sequence of operation of the state counter 45 to enter the various operands and control the operating sequences for the different multiplication modes of operation. The system automatically will assume the proper mode in accordance with the sequence of codes which are applied to the instruction lines I0, I1 and I2.

As stated previously, if the machine enters its loading sequence and a new X operand has not been loaded, the machine proceeds with the previously loaded X operand. This "loading while processing" allows a cycle to be saved during chain calculations.

A key feature of the system is its ability to perform both positive and negative multiplications without any speed penalties. The multiplication operation, irrespective of whether a positive or negative multiplication is involved, requires only 8 time slots after the time periods or clock periods which are necessary for loading the necessary operands. Similarly, there is no speed penalty for those multiplication operations which include accumulation of products or the addition of products to single length or double length numbers, since the accumulations and additions are effected at the same time the multiplications may be simply programmed, as is readily apparent from an examination of the programming sequence shown in FIG. 5. The system operates equally as well in fractions or integers following the initial establishment of one or the other of these modes of operation in response to the application of the corresponding instruction codes on the instruction lines I0, I1 and I2.

Reference now should be made to FIG. 6 which shows the 7 different division options which are possible with the multiplier/divider when it is operated in a division mode of operation. The table of FIG. 6 is similar in its arrangement to the table of FIG. 5, and the same designations are used in this table to indicate the same types of entry of operands to effect the various different division operations which can take place. From a comparison from the tables in FIGS. 5 and 6, it can be seen that the multiplication operations are effected by the decimal instruction codes 0, 1, 2 and 3 (binary 000, 001, 010, 011) on the leads I0, I1 and I2. The division operations are initiated by decimal instruction codes 4 or 5 (binary 100, 101). Initial instruction 5 or 6 enters the fractional or integer number designation into the X register 23, the divisor register.

Except for the set of conditions shown on the top line of FIG. 6, where the division is of the previously generated result by a previously entered divisor, the first time period for any of the division operations is similar to the first time period for any of the multiplication operations. Thus, the operand is entered first into the X register 23 in response to an instruction code 6 (binary 110) or 5 (binary 101) which are used to load an integer or load a fraction, respectively, into the X register.

As described above in conjunction with the multiplication operations, all numbers are in the two's complement number representation, with the most significant bit of an operand, whether double or single length, having a negative weight. In order to facilitate repeated division and have a multiple length quotient keep the same sign, the remainder is always the same sign as the dividend. After the entry of the various operands, the next 19 or 20 clock periods are used by the system in the division mode to effect the division operation. This variation is indicated on the right hand side of FIG. 6 by the blocks with a "I" located in them. Fractional division divides a 31 bit 2's complement number in one clock period less than integer division; so that, for example, the division operation indicated on the top line of the table of FIG. 7 takes a total of 20 clock periods if fractional division is being effected or 21 clock periods if integer division is being effected. The total length of the division operation, as with the various multiplication operations, requires additional clock periods for the more complex divisional operations which require the loading of additional operands.

For the loading of operands into the Z register 26, the operational sequence requires the operand to be loaded first into the W register 25. Then during the next time interval, the information in the W register 25 is "swapped" or transferred into the Z register 26 where it then is available for the subsequent division operations.

An examination of the table of FIG. 6 shows that in all cases where an operand is to be loaded into the Z register 26, there is a following time interval for initiating the divide operation where an additional operand is placed in the W register 25 or a command is simply given to set the system in its proper divide mode of operation prior to the actual divisional operation sequence.

The manner in which the data is transferred between the X register to the arithmetic logic unit 28 and between the arithmetic logic unit 28 and the Z and W registers again is controlled by the encoding on the instruction lines I0, I1 and I2 in conjunction with the status of the count in the state counter 45 as the sequential clock pulses are applied to the system on the lead 47. The algorithm is employed in the division operation and is the familiar non-restoring division. This algorithm is described in several places in the technical literature for example:

Gschwind, H. W., "Design of Digital Computers", Springer-Verlag, New York, 1967. pp. 220-235.

With the above background material in mind, reference now again should be made to FIG. 8. Initially assume that the system is cleared, the state counter 45 is in its "0" state; and for the purposes of this initial determination, assume that the sequence of clock pulses also is at 0. This is indicated in FIG. 8 by the number "0" in the square box (the designation of the state of the state counter 45 starting point indicated on the legend of FIG. 8) and the number "0" in the circle representative of the sequence or clock number. If, with the system in this state of operation, any one of the multiplication mode instruction codes 0, 1, 2 or 3 appear on the instruction code lines, the next clock pulse received by the system places the state counter 45 in its state number "4". This is because of the interconnections to the input gates of the state counter 45 which are made from the instruction code lines as shown across the bottom of FIGS. 3C and 3D. The particular mode selected is in accordance with the previous status of this system for the multiplication operation as shown in FIG. 5.

Once the system is in its state 4, it is in its multiplication operation mode; and the remainder of the clock pulses simply sequence the system through its normal multiplication operation. This is indicated in FIG. 8 by the output arrow from the sequence circle "4" to the sequence circle "5-11". The next clock pulse places the system in its sequence number "5-11" and the state counter 45 goes to state 12 and remains there for the balance of the multiplication operation. After the 8 clock pulses which are necessary to complete the multiplication operation, the state counter 45 changes to state count inputs to its gates; but the system is at sequence number "32" as shown in FIG. 8.

Once the multiplication has been completed and the system is at sequence "32" and the state of the state counter 45 is in state "8", a number of options are available, depending upon the instruction code which now appears on the instruction code lines I0, I1 and I2. These options are shown in the legend of FIG. 8 and are also identified by the four lines shown extending from the sequence circle 32 to the sequence number circles 0, 1, 4 and 12. For example, if a rounding or a readout of the product which has been accomplished by this multiplication operation is desired, the instruction lines have an instruction code 5 (for rounding) or 7 (for read) on them. The next clock pulse then accomplishes the desired rounding or reading and places the system back to its starting point (sequence 0) with the state counter 45 in its "0" state and the sequence ready for a new sequence of operation.

On the other hand, since the system is capable of chain operations, the "0" state can be bypassed; and chain multiplication or concatenated division operations can be performed in conjunction with the just completed multiplication operation. As an example, if the instruction code is instruction code "6" at the end of the multiplication operation at sequence 32, the combination of this instruction code with state "8" of the state counter 45 causes the state counter to be driven to its state "1"; and the sequence number also is sequence number 1 as shown in FIG. 8. This adds a new operand to the system, as described previously in conjunction with FIGS. 5 and 6, which show that this causes the entry of this new operand into the X register 23 of the system.

As is apparent from an examination of FIG. 8, a large number of options now are available for the next step in the sequence of operation of the system. If any one of the instruction codes 0, 1, 2 or 3 for multiplication operations again appear, the system is driven to sequence number 4 and the state counter 45 also is driven to state "4". This then places the system back in its multiplication mode of operation and a multiplication sequence again will take place.

On the other hand, if either one of the division mode instruction codes 4 or 5 appear when the system is at state 1, the next clock pulse drives the system to what is shown as sequence number 12, and the state counter 45 is placed in its state "5". This status of the system places it in one of its division modes of operation, (as previously determined by the sequence of loading of operands) and the following sequences illustrated in the output chain from sequence circle 12 are followed for the next succeeding clock pulses to complete the selected division mode of operation.

If a division mode is in process, it is completed at sequence number 32; and the state counter 45 is placed in its state "10" as shown in FIG. 8. At this point the various options from the sequence circle 33 are available in accordance with whatever instruction codes are present on the instruction lines I0, I1 and I2 at this time. If instruction codes 5 or 7 are present, a rounding or reading operation takes place; and the system is driven back to its 0 sequence number and the state counter 45 is at its "0" state.

The other options at sequence 33 with the state counter 45 in its state "10" are shown in the legend for the other different instruction codes which can appear. For example if instruction "4" is present at the time of the next clock pulse, the state counter 45 is driven to state 5 (the "next state" shown in the legend in FIG. 8) which is at sequence number 12; and a new division operation takes place, where the previously stored divisor in the X register divides the previous quotient stored in the Z and W registers as shown in the chart on FIG. 6. On the other hand, if any of the multiplication instruction codes 0, 1, 2 or 3 are present, the system moves to a multiplication operation, again based on the previously stored multiplicand in the X register in accordance with the various options shown in the top 4 horizontal lines of FIG. 5. If instruction code 6 is present, the state counter is placed in its state 1 and sequence 1. This causes the entry of a new operand into the X register; and then any of the various operations from state 1 of the counter 45, and sequence 1 shown in FIG. 8 can take place.

When the system is in state "1", sequence 1, as shown in FIG. 8, it also may be operated in accordance with the tables shown in FIGS. 5 and 6 to enter additional operands into the Z and W registers in accordance with the more complex modes of multiplication or division operations which are shown in those figures and which have been described previously. These are effected by continuing to apply an instruction code 5 to the system, so that it steps from sequence 1 to sequence 2 (state "3" of counter 45). If additional entries still are to be made into the system, it is stepped by the next clock pulse under the control of instruction code 6 from sequence 2 to sequence 3. From either of sequences 2 or 3 (state counter 45 in state 3 or state 11, respectively) the system can be driven to any one of its division or multiplication modes in accordance with the designations shown on the arrows going from sequence circle 2 to circles 4 and 12 and from sequence circle 3 to circles 4 and 12. Once those sequences (4 or 12) have been reached and the state counter 45 is in either its state 4 or state 5 for the multiplication or division modes, respectively, the above-described multiplication or division operations take place.

From FIG. 8, it also is apparent that if a "read" instruction code (7) is applied over the instruction code lines during any of the operand loading operations (shown at sequences 0, 1, 2 or 3), the system is cleared and reverts back to its reading mode and is placed back in its "0" sequence state "0" of the state counter 45 for a resumption of operation. In effect, the application of a "read" code 7 during the loading operation clears the register, and the system starts over with a new sequence.

FIG. 7 correlates the sequence numbers with the instruction codes for the various conditions and states of operation which have been explained above in conjunction with FIGS. 5, 6 and 8, and presents this information in another form for assisting in an understanding of the various operation combinations and their sequences, as explained in the other tables of FIGS. 5, 6 and 8.

From the foregoing, and particularly from a reference to FIG. 8, it can be seen that various operations can be concatenated in strings to perform complex 2's complement arithmetic operations at high speed. As is apparent from an examination of FIG. 8, rounding and reading of results can be performed after the completion of any multiplication or division operation.

Generally, rounding is only called out during fractional operation of the machine; but nothing in the machine precludes forming a rounded result during integer working. Rounding for multiplication provides the best single length most significant half of the product. Rounding occurs at the end of a multiplication, as described above, and is performed instead of a load or read operation as is apparent from an examination of the transition table of FIG. 8. The machine looks at the most significant bit of the least significant half of the product (W15) and adds 1 to the most significant half of the product at the least significant end if W15 is a binary "1". After the operations, the machine is in state 0; so that the rounded product can be read, as indicated by the circular line around the transition state box "0" shown in FIG. 8. The W register is clear at this point.

Division rounding is performed by forcing the least significant bit of the quotient in the Z register 26 to a binary "1" unless the division is exact (remainder is 0). This method of rounding causes a slightly higher variance in the result then having an additional iterative division operation; but it is considerably easier to perform. Again after rounding, the machine goes to state 0 of the state counter 45; so that a read operation can be performed; and the W register is clear.

The machine has an overflow output which is obtained from an overflow register 60 (FIG. 3F) and which is cleared prior to an operation. This overflow is set during an operation if the product or quotient goes outside the normally accepted range.

The gate inputs to the register 60 for producing an overflow output indication are connected so that for multiplication, overflow can only occur if the most negative number in the operand range is used ($-1 \times -1 = +1$) which cannot be held in the machine. Overflow can more frequently occur during accumulation of product either positively or negatively. For fractional working, if the product or accumulation goes outside the range of $-1$ to $+1-2^{-31}$, then the overflow flip flop in the register 60 is set.

Figure 3E:
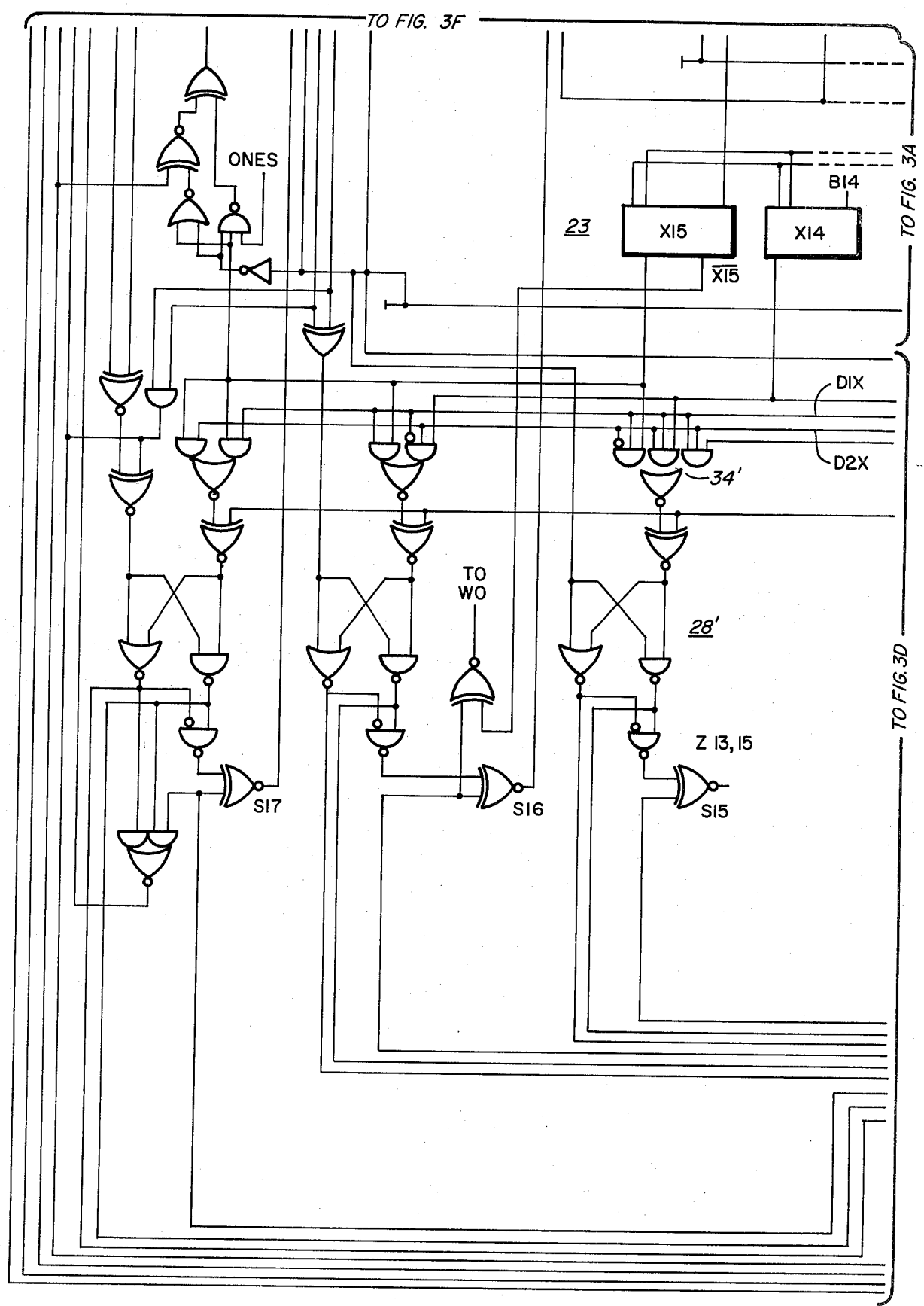

Division overflow occurs if the quotient goes outside the generally accepted number range of $-1$ to $+1-2^{-15}$ during fractional operation. This occurs if the divisor is less than the dividend or equal to the dividend if a positive quotient is being generated. For integer working, the numbers must be scaled by $2^{15}$. The overflow logic on the left-hand sides of FIGS. 3E and 3F is a conventional implementation and is not new to this system.

The foregoing description has been directed to the $16 \times 16$ multiplier configuration shown in FIG. 3. The same techniques however, can be employed also for an $8 \times 8$ register, or for a larger register (such as $24 \times 24$ or $32 \times 32$) if desired. The system will operate for smaller or larger circuit configurations employing the same techniques and gating arrangements which have been shown in the specific example given. The system shown in detail in FIG. 3 is a complex, highly sophisticated, multiplier/divider circuit which may be integrated on a single integrated circuit chip, causing it to be a highly versatile system components in a wide range of system applications.

Various modifications and changes may occur to those skilled in the art in implementing variations of the system, which has been described above and shown in detail in the accompanying drawings, without departing from the scope of the invention as set forth in the appended claims.

We claim:

1. A digital multiplier including in combination:
   first means for receiving a plurality of multiplicand signals;
   second means for receiving a plurality of multiplier signals;
   decoder means coupled with predetermined ones of said multiplier signals less than the total number of said multiplier signals for producing control signals representative of the logic levels of said predetermined signals;
   arithmetic logic circuit means connected to said multiplicand signals and said decoder means, and responsive to said control signals for producing a partial product of the multiplier number represeted by the predetermined multiplier signals and the multiplicand number represented by said multiplicand signals;
   means coupled to said second means and to said decoder means for supplying different portions of the multiplier to the predetermined number of said multiplier signals in synchronism with the operation of said arithmetic logic circuit means; and
   mode control means for receiving mode control input signals and coupled to said arithmetic logic circuit means and said first means for controlling said digital multiplier to operate in one of a plurality of different multiplication options, said first means including a multiplicand register which is a master/slave register with the multiplicand number stored in the master section thereof being transferred to the slave section thereof for use in multiplication operations, the multiplicand number in the slave section thereof remaining for successive operations of said digital multiplier until said multiplicand number is changed at predetermined intervals under control of said mode control means.

2. The combination according to claim 1 wherein said arithmetic logic circuit means includes accumulator means for accumulating and combining successive partial products and said supplying means comprises means for supplying different ones of said multiplier signals to said decoder means for decoding by said decoder means for producing different successive partial products of the multiplier number and the multiplicand number by said arithmetic logic circuit means.

3. The combination according to claim 2 wherein said predetermined ones of said multiplier signals comprise three adjacent inputs and said supplying means couples different groups of three adjacent bits of the multiplier number to said three inputs, each of said groups including one multiplier bit overlapping each adjacent group.

4. The combination according to claim 3 wherein said decoder means is a decoder for the Modified Booth Algorithm; said arithmetic logic means includes a shift multiplex input circuit means and a predetermined number of adder logic stages at least equal in number to the number of said multiplicand signals; and the control signals from said decoder means control said shift multiplex input circuit means to cause the multiplicand signals to be supplied to different inputs of said arithmetic logic circuit means in accordance with said control signals.

5. The combination according to claim 4 wherein said multiplier is a $16 \times 16$ bit multiplier implemented in a single integrated circuit semiconductor chip.

6. A digital multiplier including in combination:
   a multi-stage multiplicand register for storing a multiplicand number;
   a multi-stage multiplier register for storing a multiplier number;
   decoder means coupled with predetermined stages of said multiplier register less than the total number of stages thereof for producing control signals representative of the logic levels of signals stored in said predetermined stages of said multiplier register;
   arithmetic logic circuit means connected to said multiplicand register and said decoder means and responsive to said control signals for producing a partial product of said multiplier number and said multiplicand number;
   means coupled to said multiplier register and to said decoder means for supplying different portions of said multiplier number to the predetermined stages of said multiplier register in synchronism with the operation of said arithmetic logic circuit means; and
   mode control input means for receiving mode control input signals and coupled with at least said arithmetic logic circuit means and said multiplicand register for controlling said digital multiplier to operate in one of a plurality of different multiplication options, said multiplicand register being a master/- slave register with the multiplicand number stored in the master section thereof being transferred to the slave section thereof for use in multiplication operations to be performed by said digital multiplier, the multiplicand number in the slave section thereof remaining for successive operations of said digital multiplier until said multiplicand number is changed at predetermined intervals under control of said mode control input means in the sequence of operation of said digital multiplier.

7. The combination according to claim 6 wherein said digital multiplier is a 16×16 bit multiplier implemented in a single semiconductor chip.

8. The combination according to claim 6 wherein said arithmetic logic circuit means includes accumulator means for accumulating and combining successive partial products and said supplying means comprises means for shifting the multiplier number in said multiplier register for shifting different portions of said multiplier number to the predetermined stages of said multiplier register for decoding by said decoder means for producing different successive partial products of said multiplier number and said multiplicand number by said arithmetic logic circuit means.

9. The combination according to claim 8 wherein said digital multiplier is a 16×16 bit multiplier implemented in a single semiconductor chip.

10. The combination according to claim 8 wherein said predetermined stages of said multiplier register comprise three adjacent stages, and said shifting means shifts said multiplier number through said multiplier register in groups, each of said groups including one multiplier bit of each adjacent group.

11. The combination according to claim 10 wherein said decoder means is a decoder for the Modified Booth Algorithm; said arithmetic logic circuit means includes a shift multiplex input circuit means and a predetermined number of adder logic stages at least equal in number to the number of stages of said multiplicand register; and the control signals from said decoder means control said shift multiplex input circuit means to cause the outputs of said multiplicand register to be supplied to different inputs of said arithmetic logic circuit means in accordance with said control signals.

12. The combination according to claim 8 further including mode control input means for receiving mode control input signals and coupled with at least said arithmetic logic circuit means for controlling said digital multiplier to operate in one of a plurality of different multiplication options.

13. The combination according to claim 12 wherein said mode control input means is coupled to said multiplicand register and said multiplicand register includes means for storing the same multiplicand number for multiplication by different multiplier numbers in successive operations of said digital multiplier and optionally to store different multiplicand numbers in response to a predetermined output of said mode input means for successive multiplication by the numbers stored in said multiplier register.

14. The combination according to claim 12 wherein said accumulator means comprises a double length accumulator register having first and second multi-stage sections, each having a number of stages at least equal to the number of stages of said multiplicand register, and wherein said arithmetic logic circuit means operates to supply the partial products to said accumulator register in a predetermined manner.

15. The combination according to claim 14 wherein said first accumulator register section holds the most significant half of a product after a multiplication operation has been completed and said second accumulator register section holds the least significant half of a product after a multiplication.

16. A buss organized digital multiplier/divider system including in combination:
a plurality of input/output busses for receiving and delivering parallel binary-encoded digital numbers;
a multiplicand and divisor register having a number of stages equal to the plurality of busses, each stage thereof connected to receive signals from a different one of said busses;
a multiplier register having a plurality of stages, with each stage connected to a different one of said busses for receiving signals therefrom;
system control circuit means coupled to said registers and having a plurality of multiplication and division modes of operation said control circuit means including means for establishing each of said modes of operation for controlling the transfer of data on said busses to said multiplier and said multiplicand and divisor registers at predetermined times;
an accumulator product and dividend register having a plurality of stages at least equal to the number of busses and coupled to said busses for receiving signals from and delivering signals to said busses and further coupled with said control circuit means to accept information from said busses or deliver information to said busses in accordance with the mode of operation of said control circuit means;
decoder means coupled with the outputs of predetermined stages of said multiplier register less than the total number of stages thereof for producing control signals representative of the logic levels of signals stored in said predetermined stages of said multiplier register; and
arithmetic logic circuit means having a plurality of outputs coupled with corresponding stages of said accumulator register and coupled to said system control circuit means, said multiplicand and divisor register and said accumulator register, said logic circuit means being responsive to said control signals for producing on said plurality of outputs a partial product of said multiplier number and said multiplicand number when said system is operated in a multiplication mode by said system control circuit means and for producing in said accumulator register a quotient of the dividend previously stored in said accumulator register and the divisor stored in said multiplicand/divisor register when said system is operated in a division mode.

17. The combination according to claim 16 wherein said multiplier/divider system is implemented in a single integrated circuit semiconductor chip.

18. The combination according to claim 17 wherein said multiplier/divider system is a 16×16 bit system.

19. The combination according to claim 16 wherein said system control circuit means causes said system to operate in one of several multiplication modes including positive multiplication, negative multiplication, positive and negative accumulation, multiplication by a constant, and single and double length addition in conjunction with multiplication, or to operate in one of several division modes, including single division, double length division, division of a previously generated number, division by a constant, or continual division of a remainder or quotient.

20. The combination according to claim 16 further including means for applying clock pulse signals to said control circuit means; and status counter means coupled with selected outputs of said decoder means and said control circuit means and operating in cooperation therewith for controlling the sequence of transferring data from and to said data busses to said various registers and for effecting predetermined sequential operation of said arithmetic logic circuit means, said multiplier register, said multiplicand and divisor register, and said accumulator register.

21. The combination according to claim 16 wherein said accumulator register comprises first and second register sections each having a predetermined number of stages at least equal to the number of data busses to form a double length accumulator, wherein, with the system operated in a multiplication mode, the first section of said accumulator register stores the most significant half of a product and the second section stores the least significant half of a product, and, with said system operated in a division mode of operation, the first section of said accumulator register stores the quotient and the second section stores the remainder.

22. The combination according to claim 16 further including shifting means for shifting the multiplier number in said multiplier register when said system is operated in a multiplication mode for placing different portions of the multiplier number in said predetermined stages of said multiplier register for decoding by said decoder means to produce different successive partial products of the multiplier number and a multiplicand number by said arithmetic logic circuit means.

23. The combination according to claim 22 wherein said predetermined stages of said multiplier register comprise three adjacent stages and said shifting means shifts the multiplier number through said multiplier register to said predetermined stages in groups, each of said groups including one multiplier bit of each adjacent group.

24. The combination according to claim 23 wherein said decoder means is a decoder for the Modified Booth Algorithm, and said arithmetic logic circuit means includes a shift multiplex input circuit means and a number of adder logic stages, at least equal to the number of stages of said multiplicand and divisor register, wherein the control signals from said decoder means control said shift multiplex input circuit means to cause the outputs of said multiplicand and divisor register to be supplied to different adder logic stages of said arithmetic logic circuit means in accordance with said control signals when said system is operated in a multiplication mode.

25. The combination according to claim 24 wherein said multiplicand and divisor register is operated by said control circuit means to store a constant multiplicand or divisor number for multiplication by different multiplier numbers or for division into different dividends in successive operations of said digital multiplier/divider system and optionally to store a different multiplicand or divisor number for each successive multiplication or division operation of said multiplier/divider system.

26. The combination according to claim 25 wherein said multiplicand and divisor register is a master/slave register with the data stored in the master section thereof being transferred to the slave section thereof for use in multiplication or division operations to be performed by said digital multiplier/divider system and wherein the data in the slave section thereof remains for successive operations of said digital multiplier until said data is changed at predetermined intervals in the sequence of operation of said digital multiplier/divider system.

* * * * *